United States Patent
Chen

(10) Patent No.: US 11,811,511 B2
(45) Date of Patent: Nov. 7, 2023

(54) METHOD, APPARATUS, AND SYSTEM FOR COMMUNICATION BETWEEN CONTROLLERS IN TSN

(71) Applicant: Huawei Technologies Co., Ltd., Shenzhen (CN)

(72) Inventor: Lihao Chen, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/531,122

(22) Filed: Nov. 19, 2021

(65) Prior Publication Data

US 2022/0078076 A1 Mar. 10, 2022

Related U.S. Application Data

(63) Continuation of application No. PCT/CN2020/089476, filed on May 9, 2020.

(30) Foreign Application Priority Data

May 20, 2019 (CN) .......................... 201910420783.1

(51) Int. Cl.
*H04L 41/0668* (2022.01)
*H04L 41/0803* (2022.01)
(Continued)

(52) U.S. Cl.
CPC ...... *H04L 41/0803* (2013.01); *H04L 41/0668* (2013.01); *H04L 45/74* (2013.01); *H04L 47/28* (2013.01); *H04L 69/329* (2013.01)

(58) Field of Classification Search
CPC . H04L 41/0803; H04L 41/0668; H04L 45/74; H04L 47/28
(Continued)

(56) References Cited

U.S. PATENT DOCUMENTS 11,476,090 B1 * 10/2022 Ramaswamy ........... H03K 3/57
2011/0292949 A1 12/2011 Hayashi et al.
(Continued)

FOREIGN PATENT DOCUMENTS

CN 101860474 A 10/2010
CN 104754762 A 7/2015
(Continued)

OTHER PUBLICATIONS

IEEE Std 802.1Q, 2011 Edition, "IEEE Standard for Local and metropolitan area networks, Media Access Control (MAC) Bridges and Virtual Bridged Local Area Networks, IEEE Computer Society," Aug. 31, 2011, 1365 pages.
(Continued)

*Primary Examiner* — Knanh Q Dinh
(74) *Attorney, Agent, or Firm* — Conley Rose, P.C.

(57) ABSTRACT

A method for communication between controllers in TSN. A first controller receives a first packet that is sent by a second controller and that includes an identifier of a TSN domain to which the second controller belongs. The first controller determines, based on the TSN domain identifier, that the first controller and the second controller belong to a same TSN domain. The first controller sends, to the second controller, a second packet that carries user information. According to the foregoing method, communication and exchange between the controllers may be implemented, so that the controllers cooperatively configure a network device in the TSN.

18 Claims, 15 Drawing Sheets

(51) Int. Cl.
*H04L 45/74* (2022.01)
*H04L 47/28* (2022.01)
*H04L 69/329* (2022.01)

(58) Field of Classification Search
USPC .................. 709/220, 224, 227, 228, 226
See application file for complete search history.

(56) References Cited

U.S. PATENT DOCUMENTS

| | | | |
|---|---|---|---|
| 2015/0229523 A1* | 8/2015 | Park | H04L 41/5045 |
| | | | 370/392 |
| 2015/0358180 A1 | 12/2015 | Kamachi et al. | |
| 2018/0084055 A1 | 3/2018 | Mong | |
| 2018/0091518 A1 | 3/2018 | Zhuang et al. | |
| 2018/0316557 A1 | 11/2018 | Frangieh et al. | |
| 2019/0097884 A1* | 3/2019 | Thubert | H04L 43/16 |
| 2019/0109797 A1* | 4/2019 | Thubert | H04L 47/193 |
| 2019/0116000 A1* | 4/2019 | Thubert | H04L 41/0677 |
| 2019/0121781 A1 | 4/2019 | Kasichainula | |
| 2019/0124006 A1* | 4/2019 | Thubert | H04L 47/12 |
| 2019/0132253 A1* | 5/2019 | Thubert | H04L 49/9005 |
| 2019/0149629 A1* | 5/2019 | Wetterwald | H04L 67/5681 |
| | | | 709/217 |
| 2019/0253339 A1 | 8/2019 | Mehmedagic | |
| 2021/0021520 A1* | 1/2021 | Wetterwald | H04L 41/0894 |
| 2022/0037121 A1* | 2/2022 | Dorf | H01J 37/32715 |
| 2022/0367157 A1* | 11/2022 | Cui | H01J 37/32568 |
| 2022/0367158 A1* | 11/2022 | Cui | H01L 21/6833 |

FOREIGN PATENT DOCUMENTS

| | | |
|---|---|---|
| CN | 106209897 A | 12/2016 |
| CN | 106302351 A | 1/2017 |
| CN | 106549873 A | 3/2017 |
| CN | 108737003 A | 11/2018 |
| CN | 108809852 A | 11/2018 |
| CN | 108965171 A | 12/2018 |
| CN | 109691038 A | 4/2019 |
| EP | 3767899 A1 | 1/2021 |
| JP | 2006324902 A | 11/2006 |
| JP | 2008206095 A | 9/2008 |
| JP | 2009025938 A | 2/2009 |
| JP | 2014127805 A | 7/2014 |
| JP | 2017175522 A | 9/2017 |
| WO | 2009025329 A1 | 2/2009 |

OTHER PUBLICATIONS

IEEE Std 802.1QccTM-2018, "IEEE Standard for Local and Metropolitan Area Networks-Bridges and Bridged Networks, Amendment 31: Stream Reservation Protocol (SRP) Enhancements and Performance Improvements," Jun. 14, 2018, 208 pages.

3GPP TR 23.734 V16.1.0, Mar. 2019, "3rd Generation Partnership Project; Technical Specification Group Services and System Aspects; Study on 5GS Enhanced support of Vertical and LAN Services; (Release 16)," 111 pages.

Varga, B., Ed., et al., "DetNet Data Plane: IEEE 802.1 Time Sensitive Networking over MPLS," draft-ietf-detnet-tsn-vpn-over-mpls-00. May 5, 2019, 17 pages.

Bouet Mathieu et al., "Distributed SDN for Mission-Critical Networks," IEEE Military Communications Conference, Oct. 6, 2014, XP032686445, 7 pages.

Bagci K Tolga et al., Dynamic end-to-end service-level negotiation over multi-domain software defined networks, 2016 IEEE Sixth International Conference On Communications and Electronics (CCE), Jul. 27, 2016, XP032958283, 7 pages.

Schriegel Sebastian et al, "Investigation on a distributed SDN control plane architecture for heterogeneous time sensitive networks," 14th IEEE International Workshop On Factory Communication Systems (WFCS), Jun. 13, 2018, XP033369576, 10 pages.

Lihao Chen Huawei Technologies, "TSN Configuration Interaction," IEEE Draft; NEW-CHEN-TSN-CONFIGURATION-INTERACTION-071 9-VOI, IEEE-SA, Piscataway, NJ USA, vol. 802.1, No. v01, Jul. 17, 2019, XP068152019, 18 pages.

Lihao Chen, "TSN Management," Jan. 2019, 17 pages.

* cited by examiner

METHOD, APPARATUS, AND SYSTEM FOR COMMUNICATION BETWEEN CONTROLLERS IN TSN

CROSS-REFERENCE TO RELATED APPLICATIONS

This application is a continuation of International Patent Application No. PCT/CN2020/089476, filed on May 9, 2020, which claims priority to Chinese Patent Application No. 201910420783.1, filed on May 20, 2019. The disclosures of the aforementioned applications are hereby incorporated by reference in their entireties.

TECHNICAL FIELD

This application relates to the field of communication technologies, and in particular, to a method, an apparatus, and a system for communication between controllers in Time-Sensitive Networking (TSN).

BACKGROUND

TSN is a standard developed by the TSN task group of the Institute of Electrical and Electronics Engineers (IEEE) 802.1 working group. The standard mainly defines a time-sensitive transmission mechanism on the Ethernet. ATSN technology pays special attention to transmission with deterministic latency, low latency and high availability. The TSN has a wide range of application scenarios. The industry generally believes that TSN-related technologies are important enabling technologies for industrial automation, industrial Internet, and intelligent manufacturing.

The TSN technology includes a data plane, a control plane, time synchronization, and reliability. A work of the control plane is that a controller in a TSN domain reserves a resource for a network device based on a user requirement, to support the data plane of the TSN to forward a data flow. For example, the controller obtains user requirement information through a user-to-network interface (UNI), and completes, according to a Network Configuration Protocol (NETCONF), configuration of the network device in the TSN domain to which the controller belongs. Therefore, how to implement communication and exchange between controllers in a same TSN domain or different TSN domains becomes a problem to be resolved.

SUMMARY

This application provides a method, an apparatus, and a system for communication between controllers in TSN, to implement communication and exchange between the controllers in the TSN.

To achieve the foregoing objective, the following technical solutions are used in embodiments of the present disclosure.

According to a first aspect, a method for communication between controllers in TSN is provided. A first controller receives a first packet that is sent by a second controller and that includes a TSN domain identifier of the second controller, where the first packet may be an Edge Control Protocol (ECP) packet, or may be a transport control protocol (TCP) packet. The first controller determines, based on the TSN domain identifier of the second controller, that the first controller and the second controller belong to a same TSN domain. The first controller sends, to the second controller, a second packet that carries user information, where the second packet may be an ECP packet or a TCP packet. The first controller communicates with the second controller by using a controller-controller protocol (CCP). The protocol defines a packet format for communication between controllers and attribute information carried in a packet. The first packet may further include an identifier or an address of the second controller. According to the foregoing method, controllers in a same TSN domain may communicate and exchange information, so that the controllers implement collaborative management on a network device in the TSN domain.

With reference to the first aspect, in a possible implementation, the user information stored by the first controller includes one or more of a talker, a stream identifier, a stream rank, an end station port, a port identifier, a data frame specification, a media access control (MAC) address, a virtual local area network (VLAN) tag, an Internet Protocol version 4 (IPv4)-tuple, an Internet Protocol version 6 (IPv6)-tuple, a traffic specification, traffic specification time aware, a user-to-network requirement, a port capability, a listener, a status, status information, an accumulated latency, a port configuration, a time aware offset, and a failed port. For example, the user information may include all the foregoing information, or may include only the stream identifier. The first controller may select from the foregoing information according to a preset rule. According to the foregoing method, the user information can be synchronized between the controllers in the TSN domain. When an active controller is faulty or fails, a second controller that stores the user information may implement resource configuration and management on the TSN domain.

In a possible implementation, the first controller obtains a valid value of the second controller, for example, obtains the valid value of the second controller from the first packet, or obtains the valid value of the second controller from another packet. The valid value is used to indicate whether the second controller is in an active state. For example, that the valid value of the second controller is 0 indicates that the second controller is not an active controller. That the valid value of the second controller is 1 indicates that the second controller is in an election state, and may become an active controller after election. That the valid value of the second controller is 2 indicates that the second controller is an active controller. The first controller determines, based on the valid value of the second controller, that the second controller is in the election state. The first controller determines, according to a preset rule, that one controller in an election state in the TSN domain is an active controller. For example, the preset rule may be that a controller with a smallest controller identifier value is an active controller. The active state in the present disclosure refers to a state in which a controller manages and configures a TSN domain to which the controller belongs. The election state is a state where a controller is a candidate for an active controller. According to the foregoing method, communication between the controllers can be implemented, so that the controllers know statuses of each other, and election and switching of an active controller can further be implemented.

In a possible implementation, the TSN domain to which the first controller and the second controller belong further include a fourth controller. When the active controller fails, the first controller receives a valid value of the fourth controller sent by the fourth controller. The first controller determines, based on the valid value of the fourth controller, that the fourth controller is in an election state. The first controller determines, based on a valid value of the first controller, that the first controller is also in an election state.

The first controller determines, according to a preset rule, that one controller in the one or more controllers in an election state in the TSN domain is an active controller, and the elected active controller may be the first controller, or may be the fourth controller. According to this embodiment, when an active controller fails, automatic election and switching of the active controller can be performed, to avoid interruption of management and configuration caused by a failure of the active controller.

In a possible implementation, status information indicating determining of the active controller is sent to second network device within a specified period. For example, when the first controller is determined to be the active controller after election is performed, the first controller adds, within the specified period, status information indicating that the first controller is in the active state to an ECP packet or a TCP packet, and sends the ECP packet or the TCP packet to the second network device. The status information of the active controller is announced, and a network device in the TSN obtains the information of the active controller, so that the network device sends information to the active controller.

In a possible implementation, the first controller includes, but is not limited to, a first port and a second port, and the first controller receives the first packet through the first port. When the first controller determines that the first port and the second port belong to a same TSN domain, the first controller forwards the first packet to a first network device through the second port. According to this method, the first packet may be spread in a same TSN domain, so that network devices in the same TSN domain learn of attribute information of the second controller by using the first packet.

In a possible implementation, the first packet may further include an identifier or a MAC address of the second controller. The first controller sends the second packet to the second controller based on the identifier or the MAC address of the second controller. Therefore, the first controller may send a packet to another controller based on the identifier or the MAC address of the controller, to implement communication between controllers.

According to a second aspect, a method for communication between controllers in TSN is provided. A first controller receives a first packet sent by a second controller, where the first packet carries an identifier of a TSN domain to which the second controller belongs. The first controller determines, based on the TSN domain identifier of the second controller, that the first controller and the second controller do not belong to a same TSN domain. The first controller sends a second packet to the second controller, where the second packet includes an identifier of a first TSN domain to which the first controller belongs and an identifier of a second TSN domain adjacent to the first TSN domain. The first controller and the second controller may exchange information according to a CCP protocol, for example, attribute information of a controller defined in the CCP protocol is encapsulated into a TCP packet or an ECP packet for sending or receiving. According to the foregoing method, information exchange between controllers in different TSN domains may be implemented by defining a communication protocol between the controllers.

In a possible implementation, the first controller determines, based on a destination address of a data flow, one or more TSN domains through which the data flow passes to the destination address. The first controller sends attribute information of the data flow to an active controller in the determined one or more TSN domains. According to the foregoing method, the controllers in the different TSN domains collaborative management, so that cross-TSN domain resource configuration for the data flow can be implemented.

In a possible implementation, the attribute information of the data flow includes one or more of a talker, a stream identifier, a stream rank, an end station port, a port identifier, a data frame specification, a media access control MAC address, a virtual local area network VLAN tag, an Internet Protocol version 4 IPv4-tuple, an Internet Protocol version 6 IPv6-tuple, a traffic specification, traffic specification time aware, a user-to-network requirement, a port capability, a listener, a status, state information, an accumulated latency, a port configuration, a time aware offset, and a failed port.

In a possible implementation, the first controller receives a valid value of the second controller, and the valid value of the second controller indicates an active state. The first controller sends a valid value of the first controller to the second controller based on the valid value of the second controller, where the valid value of the first controller indicates an active state. According to this method, exchange between active controllers in the different TSN domains may be implemented.

In a possible implementation, the first controller receives a third packet sent by the second controller, where the third packet includes the identifier of a second TSN domain to which the second controller belongs and an identifier of a third TSN domain adjacent to the second TSN domain. The third TSN domain is different from the first TSN domain and the second TSN domain. According to the foregoing method, the controller may learn of boundary information of a TSN domain to which a controller belongs, so that the controller obtains information about an adjacent TSN domain.

According to a third aspect, an embodiment of the present disclosure provides a controller in TSN, to perform the method according to any one of the first aspect and the possible implementations of the first aspect, or the method according to any one of the second aspect and the possible implementations of the second aspect. For example, the controller includes a unit configured to perform the method according to any one of the first aspect and the possible implementations of the first aspect, or the method according to any one of the second aspect and the possible implementations of the second aspect.

According to a fourth aspect, a controller is provided. The controller includes a processor, a network port, and a memory. The memory may be configured to store program code. The processor is configured to invoke the program code in the memory to perform the method according to any one of the first aspect and the possible implementations of the first aspect, or the method according to any one of the second aspect and the possible implementations of the second aspect. For details, refer to detailed descriptions in the method examples.

According to a fifth aspect, a controller is provided, where the controller includes a main control board and an interface board. The main control board includes a first processor and a first memory. The interface board includes a second processor, a second memory, and an interface card. The second memory may be configured to store program code. The second processor is configured to invoke the program code in the second memory to perform the following operations: receiving a first packet that carries a TSN domain identifier of a second controller; and sending a second packet that carries user information.

The first memory may be configured to store program code. The first processor is configured to invoke the program code in the first memory to perform the following operations: determining, based on the TSN domain identifier of the second controller carried in the first packet, that a first controller and the second controller are in a same TSN domain.

According to a sixth aspect, a system for communication between controllers in TSN is provided. The system includes a first controller and a second controller.

The first controller is configured to receive a first packet sent by the second controller; determine, based on a TSN domain identifier of the second controller, that the first controller and the second controller belong to a same TSN domain; and send a second packet to the second controller. The first packet includes the identifier of a TSN domain to which the second controller belongs. The second packet includes user information stored by the first controller.

The second controller is configured to send the first packet and receive the second packet.

According to a seventh aspect, a system for communication between controllers in TSN is provided. The system includes a first controller and a second controller.

The first controller is configured to receive a first packet sent by the second controller; determine, based on a TSN domain identifier of the second controller, that the first controller and the second controller do not belong to a same TSN domain; and send a second packet to the second controller. The first packet includes the identifier of a TSN domain to which the second controller belongs. The second packet includes an identifier of a first TSN domain to which the first controller belongs and an identifier of a second TSN domain adjacent to the first TSN domain.

The second controller is configured to send the first packet and receive the second packet.

According to an eighth aspect, a computer storage medium is provided. The computer storage medium is configured to store computer software instructions used by the foregoing network device or controller, and the computer software instructions include a program designed to perform the foregoing aspects.

According to a ninth aspect, a computer program product is provided. The computer program product includes computer code. When the computer program code is run on a computer, the computer is enabled to execute a program according to any one of the foregoing aspects.

DESCRIPTION OF EMBODIMENTS

Figure 1:
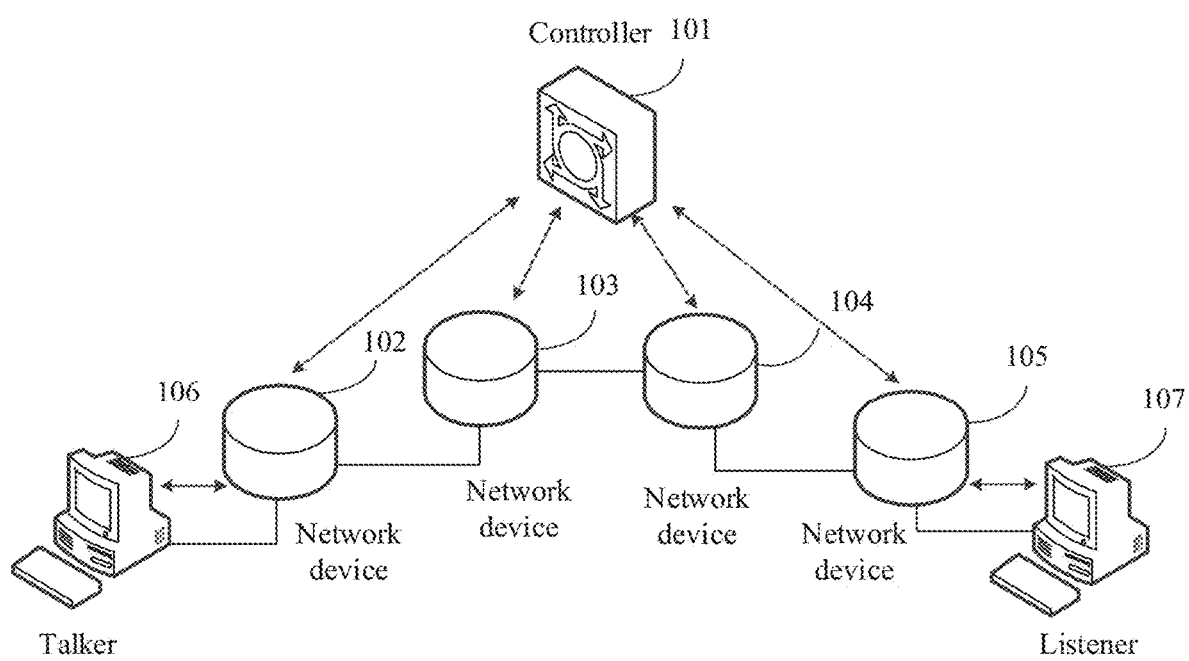
FIG. 1 is a diagram of a TSN scenario according to an embodiment of the present disclosure.

In the specification, claims, and the following accompanying drawings of the present disclosure, terms "first". "second", "third", and the like are used to distinguish different objects, but are not used to define a specific sequence, a time sequence, a priority, or a degree of importance.

In embodiments of the present disclosure, words such as "example" and "for example" are used to represent giving an example, an illustration, or a description. Any embodiment or design scheme described as an "example" or with "for example" in the embodiments of the present disclosure should not be explained as being more preferred or having more advantages than another embodiment or design scheme. Exactly, use of the words such as "example" and "for example" is intended to present a related concept in a specific manner.

For clear and concise description of the following embodiments, a TSN technology is first briefly described.

TSN is a standard studied by a time-sensitive networking task group of the IEEE 802.1 working group. The standard emphasizes an ultra-low latency and high availability in transmission. TSN is mainly applied to various Ethernet protocols that support a low latency and time-based synchronous data transmission. TSN may also be applied to industrial automation, industrial Internet, and intelligent manufacturing that utilize real-time monitoring or real-time feedback; an integrated network that combines real-time video and audio streaming, and real-time control streaming; or the like.

TSN may include different TSN domains. Division of TSN domains is determined based on TSN domain identifiers (IDs) configured for network device ports in the TSN. For example, when TSN domain identifiers of two different ports are the same, it indicates that the two ports belong to a same TSN domain. When the TSN domain identifiers of the two different ports are different, it indicates that the two ports belong to different TSN domains. A network device port may be configured with a TSN domain identifier, and different ports may be configured with different TSN domain identifiers. The TSN domain identifier of the network device port may be statically configured, may be configured by sending configuration information by a controller, or may be configured in another manner. A manner of configuration of the TSN domain identifier is not limited in the present disclosure.

A Link-Local Registration Protocol (LRP) is used to facilitate distribution of application programs between network devices in a system. The system includes a network connected by using an IEEE 802 MAC. For example, the system may be a network including a talker, a listener, a forwarding device, and a controller. The LRP can support distribution of information performed by a plurality of application protocols in the network simultaneously, where the distribution includes information announcement, transmission, registration, and the like, and maintain an announcement database and a registration database on each port of the network devices for each application protocol. In other words, each port has one LRP entity, and the foregoing database exists in the LRP entity. The LRP entity accomplishes transmitting the application programs by creating a point-to-point bidirectional association between systems. Each association includes two unidirectional paths, and each path has a database on one end and a registrar database on the other end. The LRP entity quickly and reliably copies an application program in the database to a registrar database that neighbors the LRP entity. Transmission of the data may be performed by using a TCP or an ECP.

For clear and concise description of the following embodiments, a TSN scenario model is first briefly described.

The IEEE 802.1Qcc-2018 defines three TSN configuration models. For details of the TSN configuration models, refer to Section 46 "Time-Sensitive Network (TSN) Configuration" in the IEEE P802.1Qcc. As shown in FIG. 1, the present disclosure provides a TSN centralized network model. The TSN centralized network may include a talker 106, a listener 107, network devices 102 to 105, and a controller 101. As shown in FIG. 1, the controller 101 may receive, by using the network devices 102 to 105, requirement information sent by the talker 106 and the listener 107, or may receive the requirement information by using centralized user configuration (CUC). Then, the controller reserves a resource based on the requirement information. The controller 101 sends resource reservation information to the network devices 102 to 105. In this way, the talker 106 may send a data flow to the listener 107 by using the network devices 102 to 105, to implement an ultra-low latency and high availability of data flow transmission.

The following describes the network devices in a TSN scenario shown in FIG. 1.

The talker 106 and the listener 107 may be referred to as end stations in TSN, and refer to devices at both ends for sending and receiving a data flow in an end-to-end manner. The talker 106 may also be referred to as an ingress or a start node, and the listener 107 may also be referred to as an egress or an end node. The network devices 102 to 105 may be referred to as transmission devices or forwarding devices in the TSN. For example, in a layer 2 network scenario, the network devices 102 to 105 may include bridges. The talker 106 and the listener 107 may also be devices having a bridge function. For example, the talker 106 is an end station that implements sending of a data flow, and the listener 107 is an end station that implements receiving of the data flow. The network devices 102 to 105 may include a bridge, a switch, or the like. The talker 106 and the listener 107 may include a sensor, an activator, a server, or the like. For example, in a layer 3 network scenario, the network devices 102 to 105 may be routers or layer 3 switches. The talker 106 and the listener 107 may include a network device such as the router, the layer 3 switch, or the server.

The bridge refers to a network device that works at a layer 2, for example, a data link layer, has a function of storing and forwarding a data flow in a communication network, and meets all or a combination of some requirements defined in the IEEE 802.1 standard. For example, the bridge may be a switch. A TSN data flow refers to a data flow from a sender to a receiver or from the talker to the listener, where characteristics of the data flow meet the all or the combination of some requirements defined in the IEEE 802.1 TSN series standards.

The controller 101 may be referred to as a controller or a centralized network configuration controller, has functions of collecting information in a TSN domain and performing centralized computing, and is capable of implementing optimal configuration of a network resource. One or more controllers may exist in one TSN domain. The controller 101 may be an independent control device, or may be a module that has a controller function and that is integrated into a second network device. When the controller 101 is a function module, the controller 101 may be integrated into the second network device in the TSN. For example, the controller in FIG. 1 is a function module, and may be integrated into any one of the talker 106, the listener 107, and the network devices 102 to 105. A specific form of the controller is not limited in the present disclosure.

It should be noted that, the node in the present disclosure may also be referred to as a network device. The node may be a forwarding device, a switch, a bridge, a gateway, a router, or the like, or may be a logical or virtual device that can implement a function of forwarding a data flow. This is not limited in this embodiment of the present disclosure.

The TSN technology includes a data plane, a control plane, time synchronization, and reliability. For the control plane, the controller 101 may exchange configuration information with the talker 106 and the listener 107 by using the network devices 102 to 105. For example, the network device 102 obtains user requirement information of the talker 106 through a user-to-network interface (UNI). The controller 101 may obtain the user requirement information of the talker 106 from the network device 102 by using a YANG model. The controller 101 plans or reserves a resource based on the obtained user requirement information, and sends resource reservation information to the network device 102. The controller 101 may send the resource reservation information to the network device 102 by using the YANG model, in other words, the controller 101 performs network configuration on the network device 102. For a method for obtaining the user configuration information by using the YANG model, refer to related content in the Request for Comments (RFC) 7950 of the Internet Engineering Task Force (IETF). Then, the data plane may implement end-to-end data flow transmission based on the resource reservation information delivered by the controller.

Figure 2:
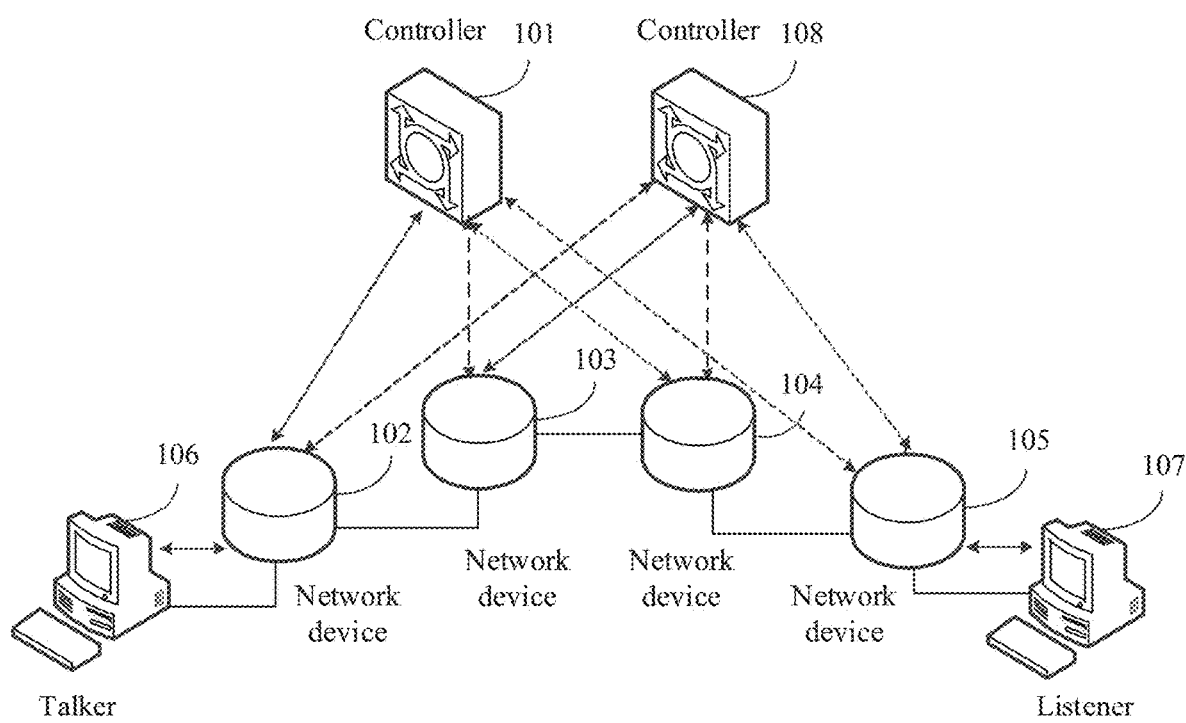
FIG. 2 is a diagram of another TSN scenario according to an embodiment of the present disclosure.
Figure 3:
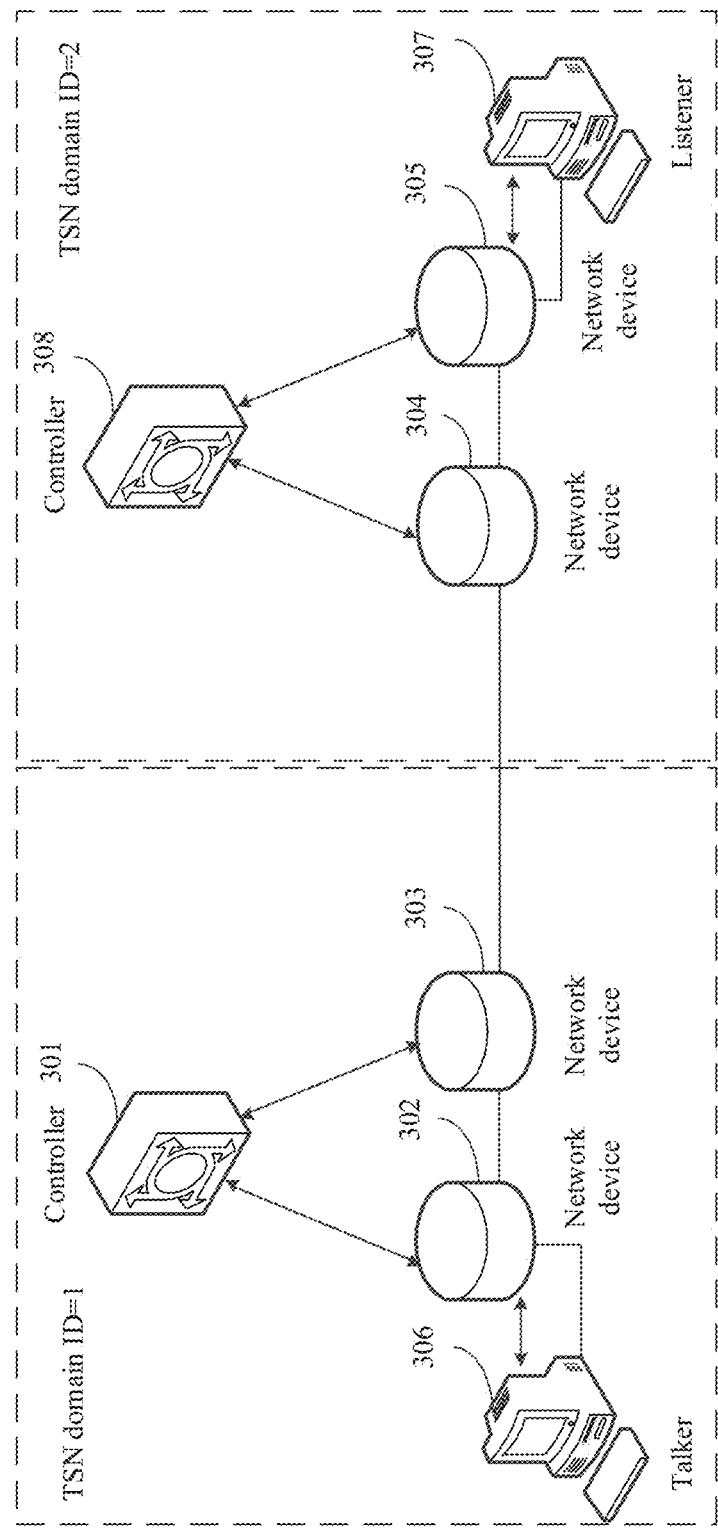
FIG. 3 is a diagram of still another TSN scenario according to an embodiment of the present disclosure.

However, one TSN domain may include one or more controllers. As shown in FIG. 2, one TSN domain includes a controller 101 and a controller 108. The TSN may further include a plurality of different TSN domains. As shown in FIG. 3, a TSN domain 1 includes a controller 301, and a TSN domain 2 includes a controller 308. When communication between controllers cannot be implemented, repeated configuration of network devices in a same TSN domain by a plurality of controllers cannot be avoided, and information synchronization between controllers and automatic switching between active and standby controllers cannot be implemented. In addition, from a talker end to a listener, a data flow may pass through a plurality of TSN domains. Because a controller performs network configuration only on a device in a TSN domain to which the controller belongs, the controller cannot implement a routing mechanism for a data flow that has left the TSN domain. Therefore, how to implement exchange and communication between different controllers in a domain and between controllers in different domains is a technical problem.

Based on the foregoing technical problem, the present disclosure provides a method, an apparatus, and a system for communication between controllers in TSN, to implement the communication and the exchange between the controllers in the same TSN domain or between the different TSN domains. A basic principle of the present disclosure is to define a protocol for communication between the controllers, for example, a CCP, where the CCP generally refers to a protocol having a communication function between controllers. Optionally, as shown in Table 1 below, attribute information defined in a controller-controller communication protocol is provided. A type, a length, and a value of the attribute information carried in the CCP are defined, communication between controllers in a TSN domain or between controllers in different TSN domains is implemented. It should be noted that a value corresponding to the type in Table 1 is used to identify different types of attribute information, and a value corresponding to the type in Table 1 may alternatively be distinguished by using another value. A specific value is not limited in the present disclosure.

TABLE 1

| TLV | Type | TLV Length | Value | Length |
|---|---|---|---|---|
| QccTLVs | 1-21 | — | One or more pieces of attribute information defined in Table 35-8 of the IEEE Std 802.1Qcc-2018 such as a talker, a stream ID, and a stream rank | For details of a length corresponding to each attribute, refer to Section 35.2.2.10 of the IEEE Std 802.1Qcc standard |
| TSN domain | 22 | 1 byte | TSN domain identifier | 6 bits |
|  |  |  | Reserved field | 2 bits |
| Controller status | 23 | Variable | Controller domain identifier | 6 bits |
|  |  |  | Controller identifier | 6 bits |
|  |  |  | Controller activeness status | 2 bits |
|  |  |  | Reserved field | 3 bits |
|  |  |  | MAC address of the controller | Variable |
| Controller synchronization | 24 | 6 bytes | Synchronization time period | 16 bits |
|  |  |  | Election time period | 16 bits |
|  |  |  | Reserved field | 16 bits |
| Boundary domain | 25 | Variable | Domain identifier | 6 bits |
|  |  |  | Boundary domain identifier | 6 bits |
|  |  |  | MAC address of a boundary port | Variable |
|  |  |  | Reserved field | 4 bits |

Optionally, the CCP protocol may be a protocol of an application layer, or may be a protocol of another layer. This application does not limit a layer of an open system interconnection (OSI) standard layer to which the protocol belongs. The controller-controller communication protocol may include all attribute information in Table 1, or may include some attribute information. The attribute information included in the controller-controller communication protocol may be selected based on a requirement.

The controller may encapsulate one or more pieces of attribute information in Table 1 into a TCP packet or an ECP packet and send the packet to another controller. In other words, the controllers in the TSN may use the TCP packet or the ECP packet to carry the attribute information in Table 1, to implement communication between the controllers. For encapsulation of the attribute information in Table 1, refer to related descriptions in FIG. 6 and FIG. 7. The following describes a specific form of encapsulation of attribute information in the TCP packet or the ECP packet with reference to a communication process between the controllers.

It should be noted that FIG. 1 to FIG. 3 are merely example descriptions of the TSN scenarios, and a quantity of nodes included in the network architecture may be configured based on an actual requirement. An actual product form of each network device in FIG. 1 to FIG. 3 may be configured based on an actual requirement. In FIG. 1 to FIG. 3, a type of each network device is merely an example, and is not specifically limited thereto.

Embodiments of the communication between the controllers in the TSN in the present disclosure are further described below with reference to the accompanying drawings.

Figure 4:
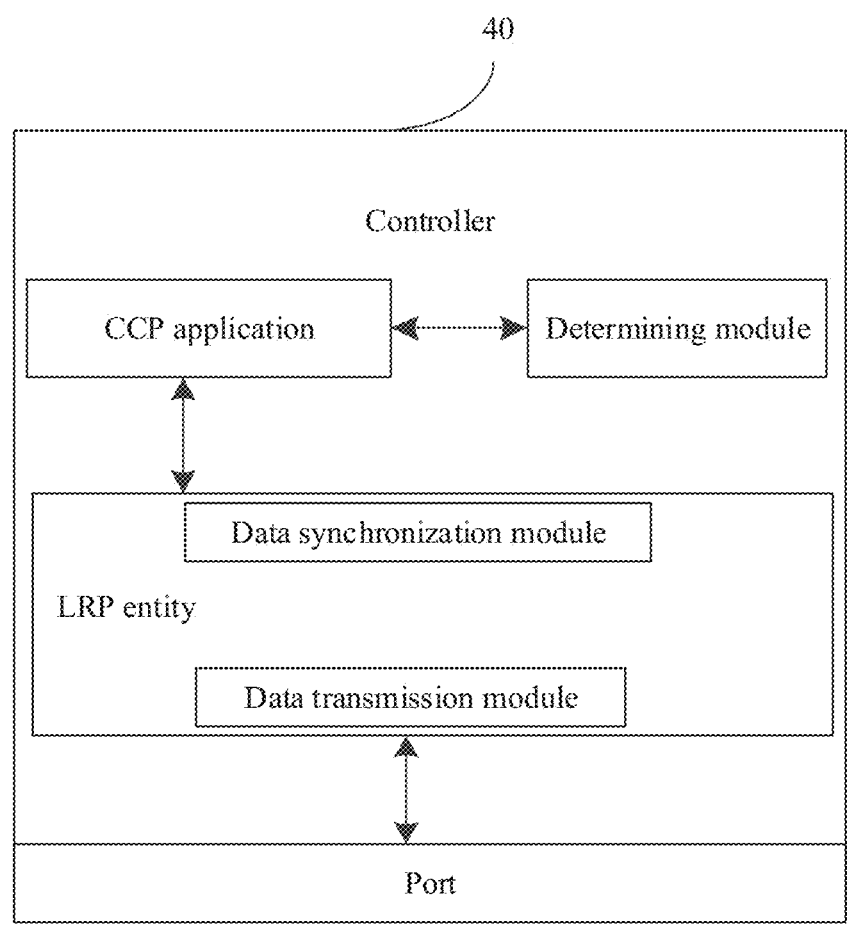
FIG. 4 is a diagram of a structure of a controller according to an embodiment of the present disclosure.

As shown in FIG. 4, an embodiment of the present disclosure provides a diagram of a structure of a network device having a controller entity. The network device may be a forwarding device having a controller function, or may be an end station having a controller entity, namely, an independent controller device. A controller 40 includes a determining module, a CCP application, an LRP entity, and a communication port. The LRP entity may include a data synchronization module and a data transport module.

The following describes each component of the controller 40 with reference to FIG. 4.

The determining module is configured to determine whether a controller corresponding to received attribute information and the controller 40 belong to a same TSN domain.

The CCP application may include attribute information of the controller 40. For example, the CCP application includes some or all of the attribute information shown in Table 1.

The LRP entity is configured to synchronize and transmit data in the CCP application. Further, the data synchronization module in the LRP entity is configured to keep synchronization with the data in the CCP application. The data synchronization module may obtain the attribute information in the CCP application, and may also transmit received attribute information of another network device to the CCP application through synchronization. The data transmission module in the LRP entity is configured to transmit data in the data synchronization module. For example, the data transmission module encapsulates the attribute information into an LRP data unit and sends the LRP data unit to a second network device through the communication port, or receives data sent by the second network device.

The communication port is configured to exchange and communicate with a second network device, and receive or send data.

For example, the CCP application includes information corresponding to the type-length-value (TLV) 23 in Table 1. The LRP entity obtains the information by using the data synchronization module, and then the data transmission module sends the information to the second network device through the communication port.

For example, the communication port receives a packet that carries attribute information and that is sent by the second controller. The data transmission module processes the packet to obtain the attribute information, and transmits the attribute information to the data synchronization module. The data synchronization module synchronizes the attribute information for the CCP application. In this way, communication between controllers is implemented.

In a possible implementation, the data synchronization module in the LRP entity may further include a data registration module and a data announcement module. The data registration module is configured to register the received attribute information of the second controller. The data announcement module is configured to send, to the data transmission module, attribute information that needs to be announced and transmitted to the second network device.

In a possible implementation, the controller 101 or the controller 108 in FIG. 2 may include the structure shown in FIG. 4. The communication port is configured to receive a first packet sent by a second controller, where the first packet includes an identifier of a TSN domain to which the second controller belongs. The controller 40 determines that the controller 40 and the second controller belong to a same TSN domain, and sends a second packet including user information to the second controller. The determining unit is configured to determine, based on a TSN domain identifier of the second controller, that the controller 40 and the second controller belong to the same TSN domain.

In a possible implementation, the controller 301 or the controller 308 in FIG. 3 may include the structure shown in FIG. 4. The communication port is configured to receive a first packet sent by a second controller, where the first packet includes an identifier of a TSN domain to which the second controller belongs. When determining that the controller 40 and the second controller do not belong to a same TSN domain, the controller 40 sends to the second controller a second packet that includes an identifier of a first TSN domain to which the first controller belongs and an identifier of a second TSN domain adjacent to the first TSN domain. The determining unit is configured to determine that the controller 40 and the second controller do not belong to the same TSN domain.

In a possible implementation, attribute information of a controller is forwarded between communication ports of controllers by using an ECP packet or a TCP packet.

Optionally, before information exchange between the controllers is performed, a TSN domain identifier needs to be first configured for each port of a network device in the TSN, to implement division into TSN domains. All ports in each TSN domain are interconnected, and paths connecting the ports do not need to cross another domain.

With reference to FIG. 2 and FIG. 3, the following describes a process of information exchange between the controllers in the TSN. Optionally, the process of the communication between the controllers includes discovery between the controllers, election between controllers in a same TSN domain, announcement of an active controller, switch of a failed active controller, information synchronization between a plurality of controllers within a TSN domain, synchronization of information of active controllers in different TSN domains, and management of the active controllers over a data flow across TSN domains. The exchange between the controllers may be independent of each other, or may be combined with each other.

Embodiment 1: Communication Between Controllers

Figure 5:
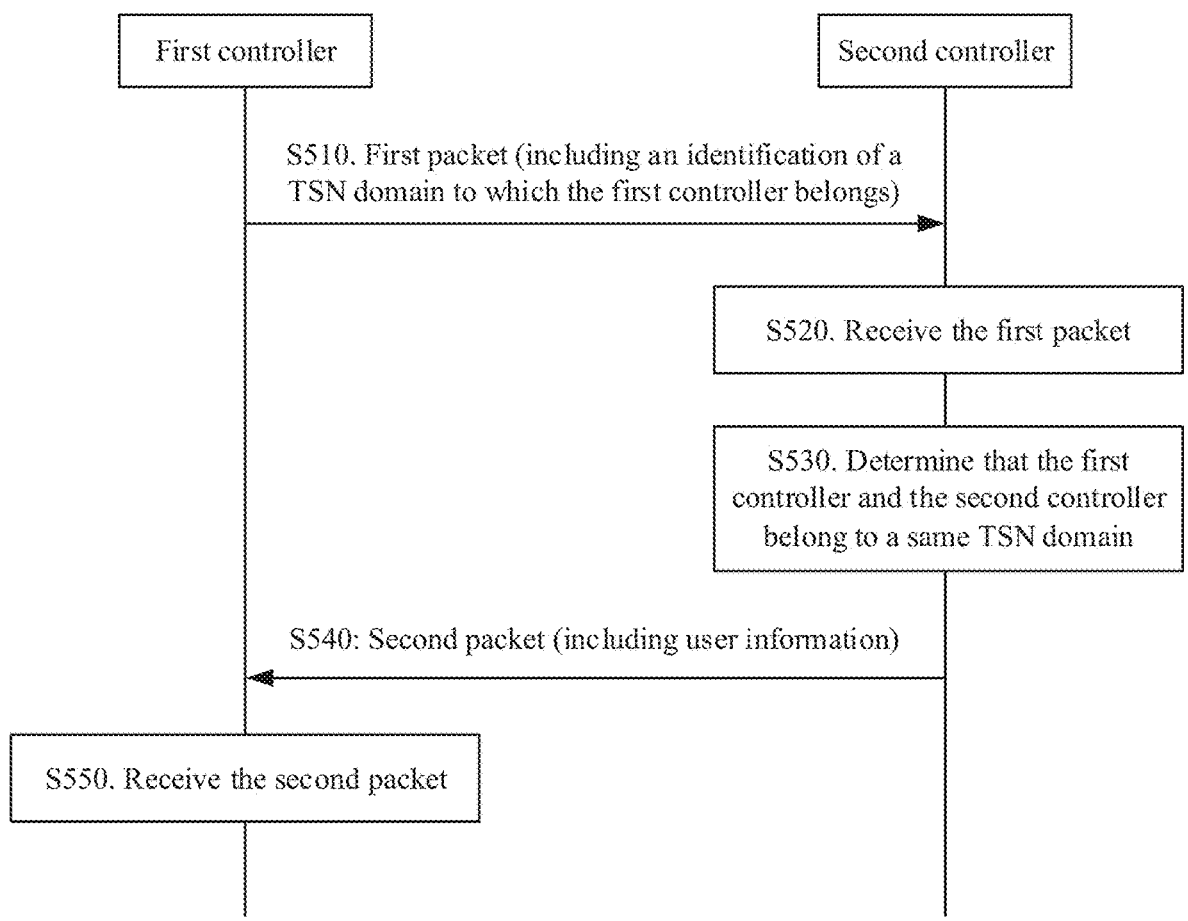
FIG. 5 is a flowchart of a method for communication between controllers in TSN according to an embodiment of the present disclosure.

FIG. 5 is a flowchart of a method for communication between controllers according to the present disclosure. The method includes a communication process of synchronizing data between a first controller and a second controller. The first controller may be the controller 101 in FIG. 2, and the second controller may be the controller 108 in FIG. 2. The first controller and the second controller may have the structure shown in FIG. 4. The method includes the following steps.

S510. The first controller sends a first packet.

In a possible implementation, a network device having a controller entity may be an independent controller device, or may be a forwarding device having a bridging function, in other words, the forwarding device is integrated with functions of the controller. The controller described in the present disclosure includes any one of the foregoing two devices.

In a possible implementation, the controller may periodically send the first packet, or may send the first packet when joining the TSN. Optionally, periodicities for sending the first packet by a plurality of controllers in a same TSN domain are set to a same value, to improve discovery efficiency between the controllers in the TSN domain.

In a possible implementation, the first packet includes status information of the first controller. For example, the status information may be some or all information corresponding to the TLV 23 in Table 1, as shown in the following Table 2. When joining the TSN, the first controller may send some or all information corresponding to the TLV 23 of the first controller to another network device in a same TSN domain, or the first controller may periodically send some or all information corresponding to the TLV 23 of the first controller to another network device in a same TSN domain. Therefore, a second controller in the same TSN domain as the first controller learns of a status of the first controller by using the status information. This implements communication and negotiation between controllers in the same TSN domain.

For example, the first packet includes a first controller domain identifier, or the first packet includes a controller domain identifier of the first controller and a MAC address of the first controller.

TABLE 2

| TLV | Type | Length | Value | Length | Description |
|---|---|---|---|---|---|
| Controller status | 23 | Variable | Controller domain identifier | 6 bits | Indicating a TSN domain to which a controller belongs |
| | | | Controller identifier | 6 bits | Unique number in a single TSN domain that identifies the controller |
| | | | Controller valid status | 2 bits | Indicating whether the controller is an elected active controller, where a value of 0 indicates the controller is not the elected active controller; a value of 1 indicates the controller is in the election state; or a value of 2 indicates the controller is the elected active controller |

TABLE 2-continued

| TLV | Type | Length | Value | Length | Description |
|---|---|---|---|---|---|
| | | | Reserved field | 2 bits | |
| | | | MAC address of the controller | Variable | MAC address of a device that the controller is in |

Figure 6:
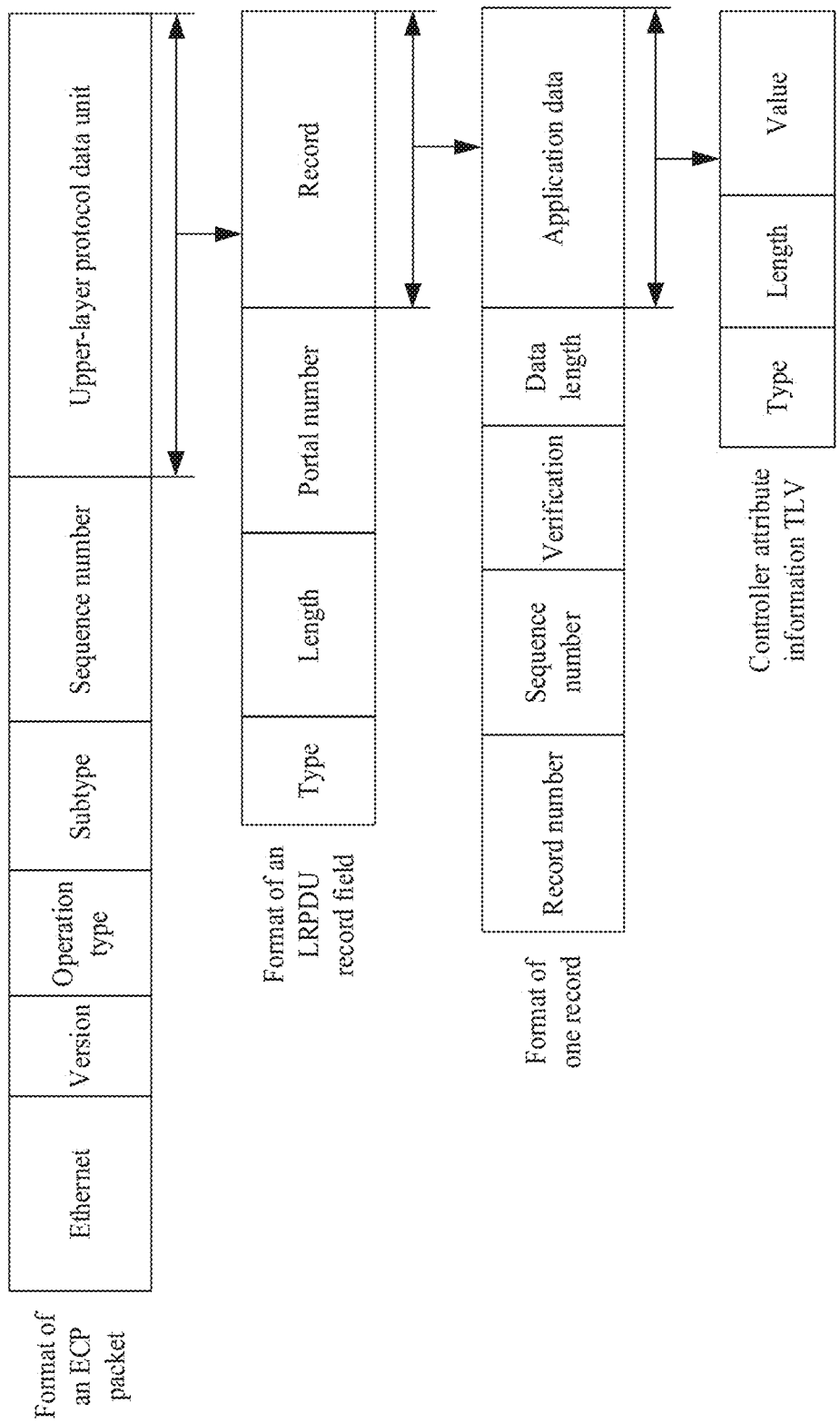
FIG. 6 is a diagram of a format of an ECP packet sent between controllers in a TSN according to an embodiment of the present disclosure.

In a possible implementation, as shown in FIG. 6, a diagram of a packet format for communication between controllers is provided. A format of the first packet may be an ECP packet shown in FIG. 6. An upper layer protocol data unit (ULPDU) in the ECP packet includes, but is not limited to, an LRP data unit (DU). A record field in the LRPDU includes, but is not limited to, one or more records, where application data in a record may be used to carry attribute information of the first controller. For example, information corresponding to the TLV 23 of the first controller is encapsulated into the application data of the record by using a TLV format, where the application data is carried in the ULPDU in the ECP packet, and is sent by the first controller to a port of an adjacent network device. The network device may be a controller, or may be a forwarding device.

Figure 7:
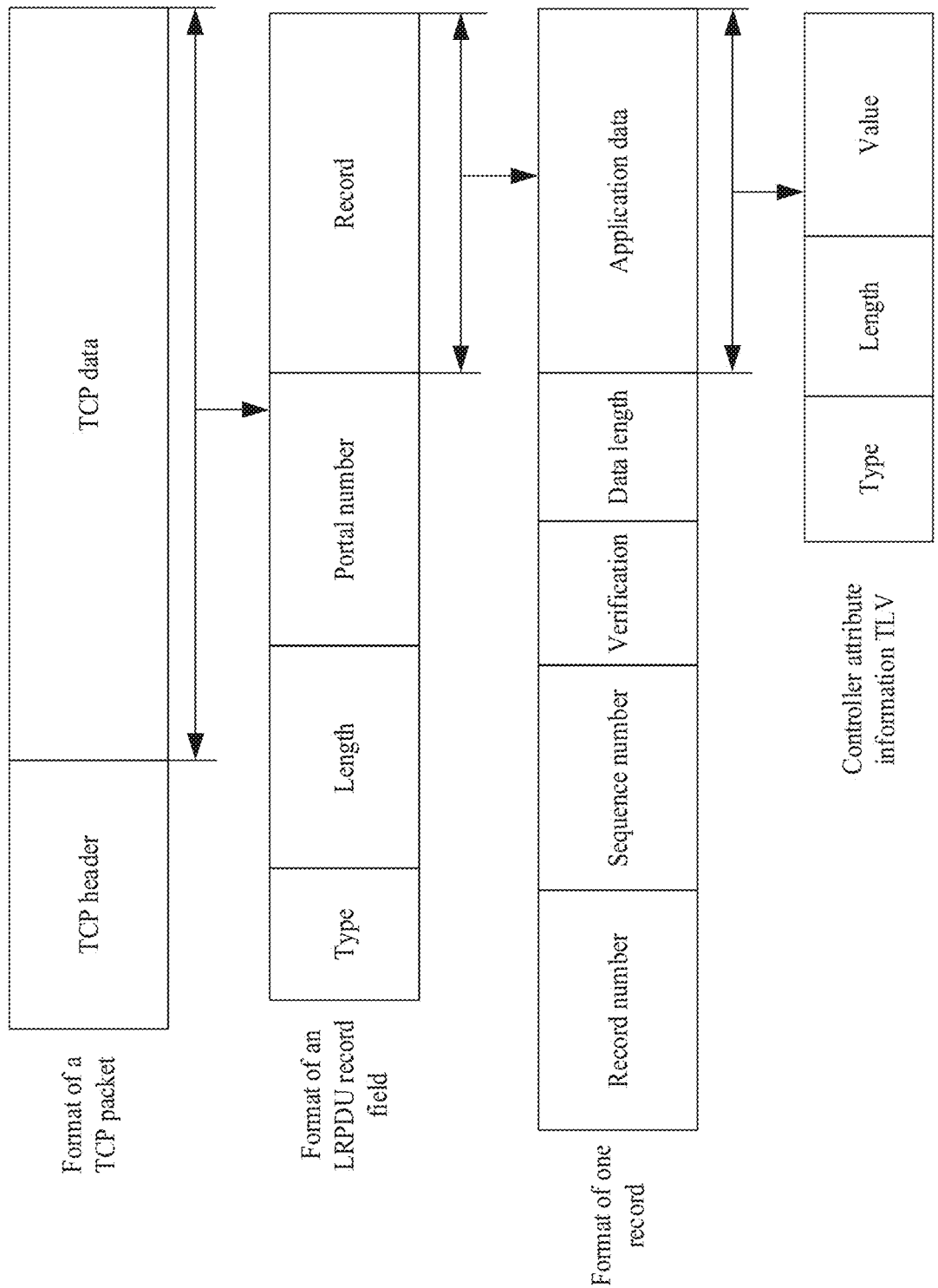
FIG. 7 is a diagram of a format of a TCP packet sent between controllers in TSN according to an embodiment of the present disclosure.

In a possible implementation, as shown in FIG. 7, another diagram of a packet format for communication between controllers is provided. A format of the first packet may be a TCP packet format shown in FIG. 7. A TCP data part in the TCP packet includes, but is not limited to, an LRPDU field. A record field in the LRPDU may include but is not limited to one or more records, where application data in a record may be used to carry attribute information of the first controller. For example, information corresponding to the TLV 23 of the first controller is encapsulated into the application data of the record by using a type-length-value format, where the application data is carried in data of the TCP packet, and is sent by a port of the first controller to a port of another network device.

In a possible implementation, status information of the first controller may be announced in a TSN domain to which the first controller belongs, and a network device in the same TSN domain may receive the status information of the first controller. Optionally, the network device in the TSN domain includes a first port and a second port. The network device receives the status information of the first controller through the first port. When the network device determines that the first port and the second port belong to a same TSN domain, the network device forwards the status information of the first controller to a neighboring network device through the second port. When the network device determines that the first port and the second port do not belong to a same TSN domain, the network device does not continue to forward the status information of the first controller to the neighboring network device, to ensure that the status information of the first controller is transmitted in the TSN domain to which the first controller belongs, so that controllers in the same TSN domain know status information of each other. The network device may be a second controller in the TSN domain to which the first controller belongs, or may be a forwarding device, a talker, or a listener in the TSN domain to which the first controller belongs.

S520. The second controller receives the first packet sent by the first controller.

Figure 8:
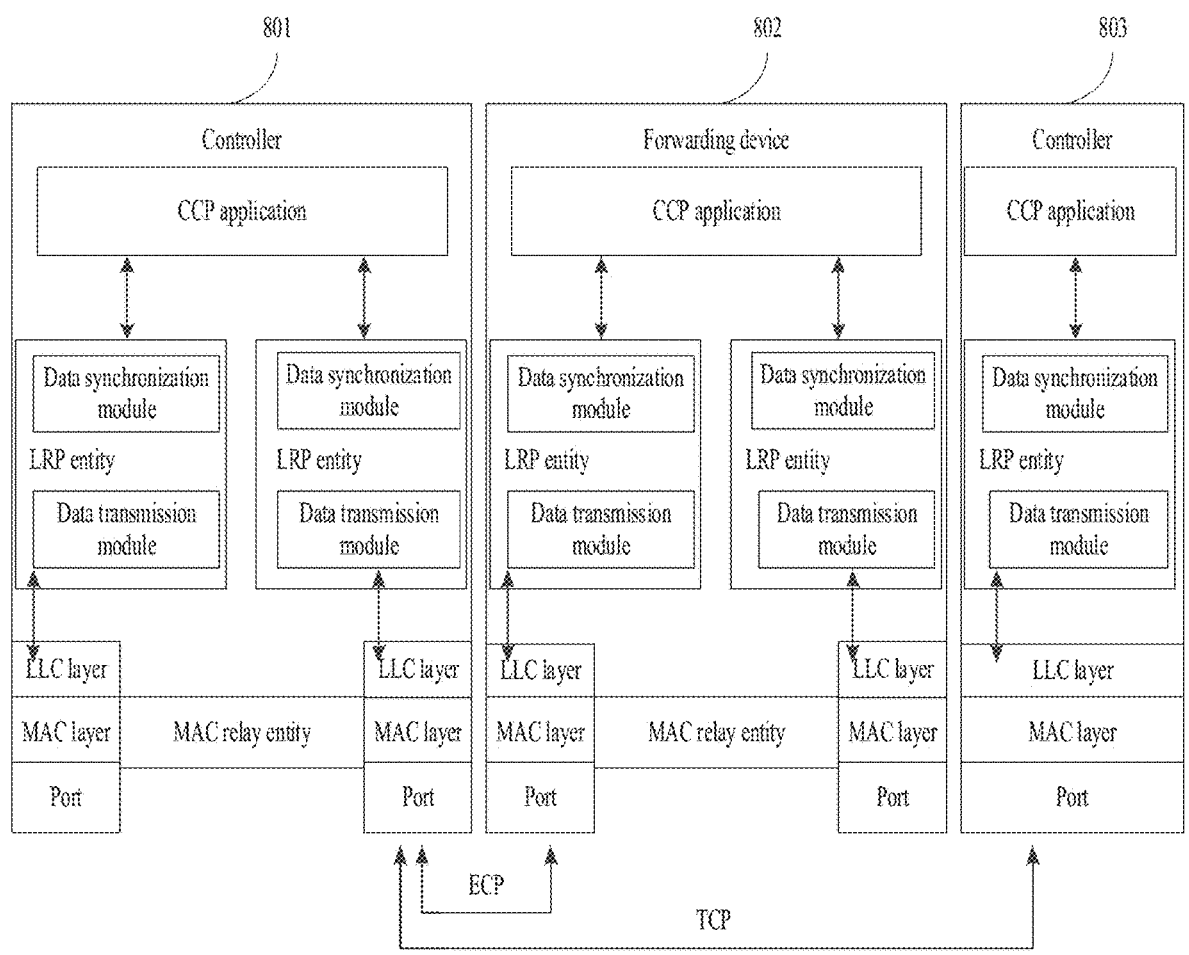
FIG. 8 is a diagram of a communication scenario between controllers in TSN according to an embodiment of the present disclosure.

In a possible implementation, the second controller receives the first packet by using a controller-controller communication protocol, for example, the communication protocol is the CCP. FIG. 8 provides a diagram of a scenario in which controllers communicate with each other by using the CCP. A network device 801 in FIG. 8 is a forwarding device having a controller function, a network device 802 is a forwarding device, and a network device 803 is an independent controller device. Alternatively, the network device 801 is referred to as a controller 801, the network device 802 is referred to as a forwarding device 802, and the network device 803 is referred to as a controller 803. For example, the network device 801 may be a bridge integrated with a controller function module, the network device 802 may be a bridge without a controller function module, and the network device 803 may be a controller end station. Each network device in the network device 801 to the network device 803 includes a CCP application and an LRP entity, where the network device 802 is directly connected to the network device 801 and the network device 803. The CCP application includes attribute information of a controller, for example, includes some or all attribute information of the controller shown in Table 1. The LRP entity is configured to synchronize and transmit the attribute information in the CCP application. Further, the LRP entity may include a data synchronization module and a data transmission module. The data synchronization module is configured to synchronize and update data in the CCP application, and the data transmission module is configured to perform transmission on the CCP application. Each network device in the network device 801 to the network device 803 may further include a logical link control layer (LLC Layer) and a MAC layer. The LLC layer uses the MAC layer to run different types of programs to support protocol identifying, multiplexing, and demultiplexing, to support transmission and receiving of data units of the spanning tree protocol and another upper-layer protocol. Each network device in the network device 801 to the network device 803 further includes a port configured to receive or send data. When the network device 801 and the network device 802 are bridges, the network device 801 and the network device 802 may further include a MAC relay entity. The MAC relay entity is configured to implement frame relay, frame filtering, and filtering information learning between ports.

The following describes, with reference to FIG. 8, a process of exchanging information between controllers by using the CCP.

The CCP application in the network device 801 synchronizes attribute information of the network device 801, for example, the CCP application in the network device 801 synchronizes information that corresponds to the TLV 23 and that is of the network device 801 to the LRP entity by using the data synchronization module and the data transmission module in the LRP entity. The LRP entity encapsulates the attribute information into the LRPDU. The network device 801 encapsulates the LRPDU into the ECP packet and sends the ECP packet to the network device 802, where the ECP may be used for data transmission between adjacent ports that are directly connected. The network device 801 may further encapsulate the LRPDU into the TCP packet and send the TCP packet to the network device 803. A port of the network device 802 receives the ECP packet sent by the network device 801, and transmits a data frame to the LRP entity in the network device 802 by using the MAC layer and the LLC layer. The LRP entity in the network device 802 transmits the obtained information of the network device 801 to the CCP application in the network device 802 by using the data synchronization module. A port of the network device 803 receives the TCP packet sent by the network device 801, and transmits a data frame to the LRP entity in the network device 803 by using the MAC layer and the LLC layer. The LRP entity in the network device 803 transmits the obtained information of the controller 801 to the CCP application in the network device 803 by using the data synchronization module. In this way, the network device 802 and the network device 803 may obtain the attribute information of the network device 801, to implement announcement of the attribute information of the network device 801 and communication between controllers.

Alternatively, the network device 803 obtains the attribute information of the network device 801 through forwarding of the network device 802.

S530. The second controller determines, based on a TSN domain identifier of the first controller, that the first controller and the second controller belong to a same TSN domain.

In a possible implementation, the domain identifier of the first controller is used to identify the identifier of the TSN domain to which the first controller belongs. When TSN domain identifiers of the first controller and the second controller are the same, the first controller and the second controller belong to a same TSN domain.

S540. The second controller sends a second packet to the first controller.

In a possible implementation, the second packet includes user information stored by the second controller. Optionally, the second packet may further include an identifier or an instruction, used to indicate the first controller to synchronize the user information in the second packet. Therefore, data information synchronization between controllers in the TSN domain can be implemented. When an active controller is faulty, because another controller in the TSN domain stores synchronization information, switching of the active controller in the TSN domain may be performed, to ensure management and configuration on a network device in the TSN domain, and implement resource reservation.

In a possible implementation, the user information carried in the second packet includes one or more of a talker, a stream ID, a stream rank, an end station device port, a port ID, a data frame specification, an IEEE802-MAC Addresses), an IEEE802-VLAN Tag, an IPv4-tuple, an IPv6-tuple, a traffic specification, traffic specification time aware, a user to network requirement, a port capability, a listener, a status, status information, an accumulated latency, a port configuration, a time aware offset, and a failed port. The second controller may select one or more pieces of information from the user information based on a requirement and send to the second controller.

In a possible implementation, the second controller may send the second packet to the first controller based on the MAC address of the first controller carried in the first packet.

In a possible implementation, the second packet may be the ECP packet shown in FIG. 6 or the TCP packet shown in FIG. 7. For a manner of how the second controller encapsulates the user information into the ECP packet, refer to the descriptions of the first packet format in FIG. 6 in step S510. For a manner of how the second controller encapsulates the user information into the TCP packet, refer to the descriptions of the first packet in FIG. 7 in step S510. Briefly, the information corresponding to the TLV 23 in FIG. 6 is replaced with some or all information corresponding to TLVs 1 to 21, and the some or all information corresponding to TLVs 1 to 21 is finally encapsulated in the ECP packet. Alternatively, the information corresponding to the TLV 23 in FIG. 7 is replaced with some or all information corresponding to TLVs 1 to 21, and the some or all information corresponding to TLVs 1 to 21 is finally encapsulated in the TCP packet.

S550. The first controller receives the second packet sent by the second controller.

In a possible implementation, the second packet includes the user information stored by the second controller. Optionally, the second packet may further include an identifier or an instruction, where the first controller synchronizes the user information in the second packet based on the identifier or according to the instruction.

Optionally, the first controller and the second controller may further send or obtain information in the following Table 3 by using the ECP packet or the TCP packet. For a specific packet format, refer to related descriptions in FIG. 6 or FIG. 7. According to this method, data information synchronization between controllers can be implemented, and election between controllers is enabled.

TABLE 3

| TLV | Type | TLV Length | Value | Length | Description |
|---|---|---|---|---|---|
| Controller synchronization | 24 | 6 bytes | Synchronization time period | 16 bits | Controller-controller LRP database definition synchronization period |
|  |  |  | Election time period | 16 bits | Controller-controller election or re-election period |
|  |  |  | Reserved field | 16 bits |  |

Figure 9:
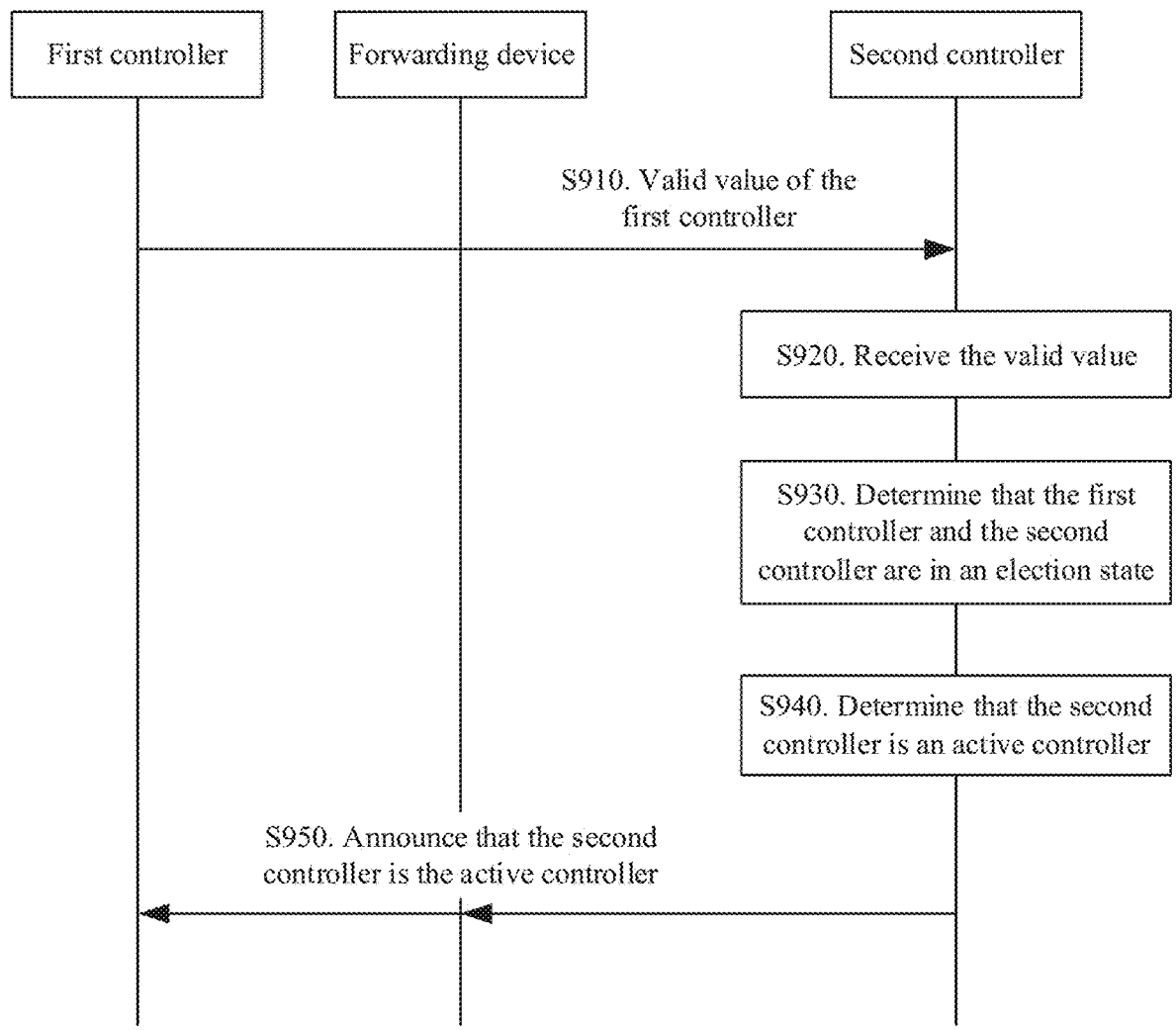
FIG. 9 is a flowchart of a method for electing an active controller from controllers in TSN according to an embodiment of the present disclosure.

Optionally, the communication method between the controllers described in Embodiment 1 may further include a process of electing an active controller between controllers. FIG. 9 provides a flowchart of another communication method between controllers. In the method, the communication between the controllers may be based on the CCP to exchange information, and the method includes the following steps.

S910. A first controller sends a valid value of the first controller to a second controller.

In a possible implementation, the first controller encapsulates the valid value of the first controller into a first packet and sends the first packet to the second controller. The valid value of the first controller is used to indicate whether the first controller is in an active state. For example, that the valid value of the first controller is 0 indicates that the first controller is not an active controller. That the valid value of the first controller is 1 indicates that the first controller is in an election state, and may become an active controller after election. That the valid value of the first controller is 2 indicates that the first controller is an active controller. The active state in the present disclosure refers to a state in which a controller controls and manages a TSN domain to which the controller belongs. The election state is a state where a controller is a candidate for an active controller.

In a possible implementation, before the first controller sends the valid value of the first controller to the second controller, the first controller determines that no active controller exists in a TSN domain to which the first controller belongs within a preset time period, and sets the valid value of the first controller to a value corresponding to the election state.

For example, with reference to FIG. 2, the controller 101 determines, within the preset time period, that the controller 101 does not receive, in the TSN domain, status information that is sent by the controller 108 and that corresponds to the controller active value of 2 in the foregoing Table 1, the controller 101 sets the valid value of the controller 101 to 1, and announces the valid value that indicates the controller 101 is in the election state to another network device in the TSN domain.

In a possible implementation, the first controller sends content corresponding to the TLV 23 (shown in Table 1) of the first controller to the second controller by using the CCP, so that the second controller obtains the valid value of the first controller.

S920. The second controller obtains the valid value of the first controller.

In a possible implementation, the second controller obtains the valid value of the first controller from the first packet.

S930. The second controller determines, based on the valid value of the first controller, that the first controller is in the election state.

In a possible implementation, the second controller is also in an election state, and a valid value of the second controller is the same as the valid value of the first controller.

S940. The second controller determines, according to a preset rule, that one controller in one or more controllers in an election state is an active controller.

In a possible implementation, the preset rule may be that the determining is based on a value of an identifier of a controller in an election state, or may be that the determining is based on a value of an address of a controller in an election state, for example, a value of a specific bit in a MAC address.

S950. The active controller sends an activeness status of the active controller to another network device.

In a possible implementation, the controller whose valid value indicates the active state announces the activeness status of the controller to the network device in the TSN domain to which the controller belongs. The controller in the active state may announce the activeness status of the controller to another network device within a preset period. Through announcement, the activeness status of the controller is registered in a database in an LRP entity of a port of a network device in a same TSN domain. Network devices spread the activeness status of the controller between adjacent network device ports by using the ECP. In this way, all network devices in the domain can learn information about a current active controller. The active controller may also announce a valid state of the controller to a controller in an adjacent TSN domain by using a TSN domain boundary network device. In this way, the activeness status can be announced by controllers between TSNs in different domains, and communication between controllers in different TSN domains can be implemented.

In a possible implementation, the first controller sends, to another network device by announcing the TLV 23, a valid value indicating that the first controller is in the active state.

For example, as shown in FIG. 2, the active controller announces the TLV 23 in a preset period, where the controller active value is 2. The TLV 23 is registered in an LRP database in each port of all network devices in the TSN domain. The ECP is responsible for spreading the TLV 23 between adjacent network devices one by one, and the CCP is responsible for spreading the TLV 23 between ports inside a device.

For example, as shown in FIG. 3, an active controller 301 may announce valid status information of the controller 301 to the controller 308 by using the TSN domain boundary network device 303 and a boundary network device in a neighboring TSN domain.

In a possible implementation, the method further includes: When the first controller is faulty or fails, election of a new active controller is performed according to a preset rule. For a specific controller election method, refer to related descriptions in steps S610 to S650. That a controller fails includes, but is not limited to, a case in which the controller loses a capability of managing a TSN domain.

Embodiment 2: Communication Between Controllers

Figure 10:
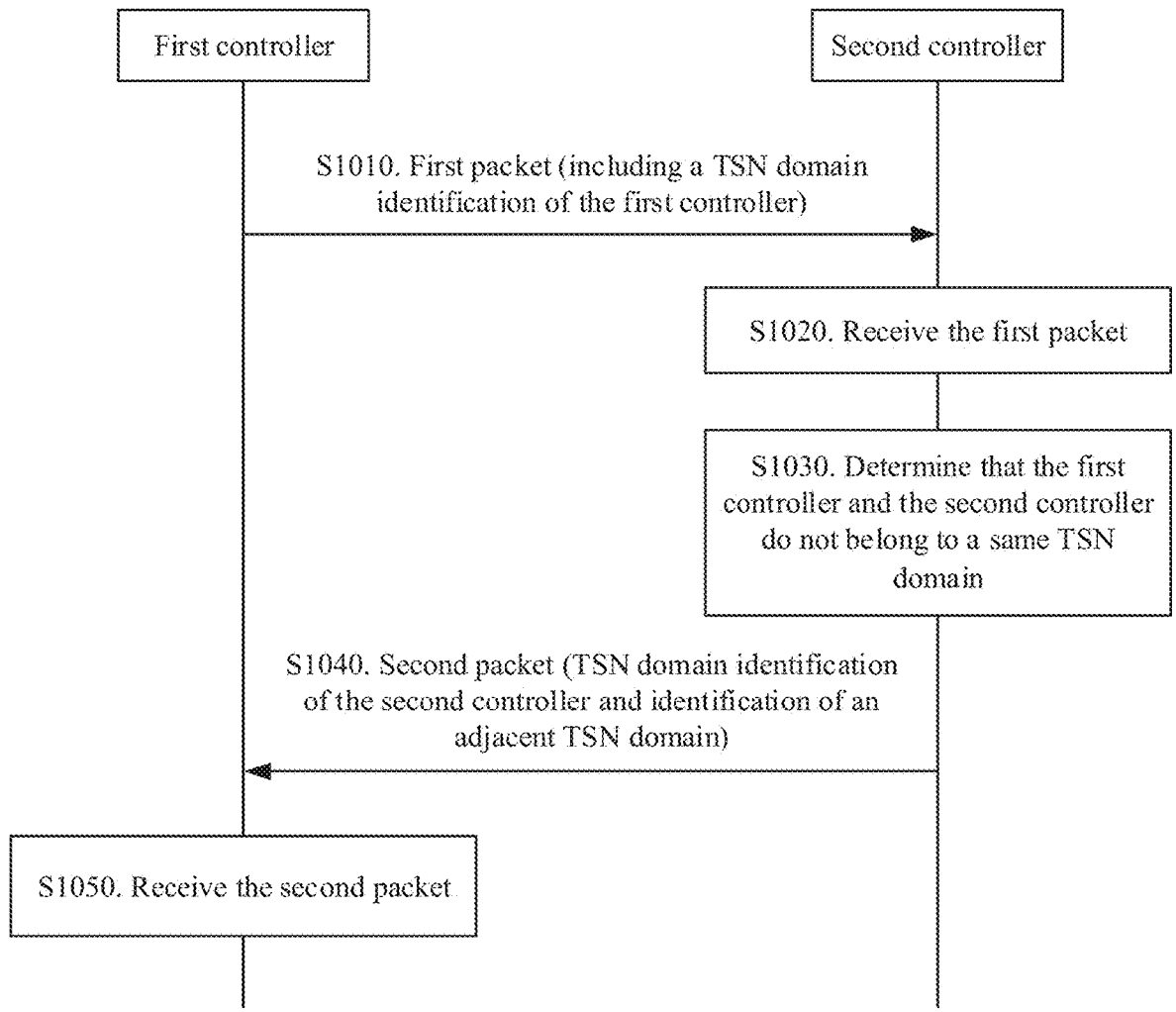
FIG. 10 is a flowchart of a method for communication between controllers in TSN according to an embodiment of the present disclosure.

FIG. 10 is a flowchart of another method for communication between controllers according to the present disclosure. The method includes a communication process between a first controller and a second controller. The first controller may be the controller 301 in FIG. 3, and the second controller may be the controller 308 in FIG. 3. The first controller and the second controller may have the structure shown in FIG. 4. The method includes the following steps.

S1010. The first controller sends a first packet.

In a possible implementation, for an implementation in which the first controller sends the first packet, refer to related descriptions of step S510 in FIG. 5.

S1020. The second controller receives the first packet sent by the first controller.

In a possible implementation, the first controller and the second controller belong to different TSN domains. The first controller belongs to a first TSN domain, the second controller belongs to a second TSN domain, and the first TSN domain may or may not be adjacent to the second TSN domain. When the first TSN domain is adjacent to the second TSN domain, the second controller may obtain the first packet by using a boundary network device in the second TSN domain. For example, a first port of a network device belongs to the first TSN domain, a second port of the network device belongs to the second TSN domain, and the network device is located at a boundary of the two adjacent TSN domains. The network device obtains the first packet of the first controller in the first TSN domain through the first port, and the network device may forward the first packet to an active controller in the second TSN domain through the second port.

S1030. The second controller determines, based on a TSN domain identifier of the first controller, that the first controller and the second controller do not belong to a same TSN domain.

In a possible implementation, a domain identifier of the first controller is used to identify an identifier of a TSN domain to which the first controller belongs. When the TSN domain identifiers of the first controller and the second controller are the same, the first controller and the second controller belong to the same TSN domain.

S1040. The second controller sends a second packet to the first controller.

In a possible implementation, the second packet includes an identifier of a first TSN domain to which the second controller belongs and an identifier of a second TSN domain adjacent to the first TSN domain.

In a possible implementation, the second packet includes some or all information corresponding to the TLV 25 shown in Table 4. In other words, the second packet may include one or more of the identifier of the TSN domain to which the second controller belongs, an identifier of a neighboring TSN domain, and a MAC address of the second controller. In this way, the second controller may exchange information with a controller in the neighboring TSN domain, to learn of TSN domain boundary information of each other.

TABLE 4

| TLV | Type | TLV Length | Value | Length |
|---|---|---|---|---|
| Boundary domain | 25 | Variable | Domain identifier | 6 bits |
| | | | Boundary domain identifier | 6 bits |
| | | | MAC address of a boundary port | Variable |
| | | | Reserved field | 4 bits |

In a possible implementation, for a format of the second packet, refer to the packet format shown in FIG. 6 or FIG. 7 and related explanations of FIG. 6 and FIG. 7.

S1050. The first controller receives the second packet sent by the second controller.

In a possible implementation, the method may further include. The first controller receives a valid value of the second controller, where the valid value of the second controller indicates that the second controller is in an active state. The first controller sends a valid value of the first controller to the second controller based on the valid value of the second controller, where the valid value of the first controller indicates that the first controller is in the active state. By using the method, active controllers in different TSN domains learn of activeness statuses of each other, to implement communication between active controllers in different TSN domains.

For example, the second controller may send a first packet of the TLV 23 carrying the valid value to a neighboring network device, and the neighboring network device further forwards the first packet. The second controller announces that the generated TLV 23 may be transmitted across TSN domains. Optionally, when receiving the TLV 23 sent from another TSN domain, a boundary network device forwards the TLV 23 to an active controller in a TSN domain to which the boundary network device belongs.

In a possible implementation, a TSN domain boundary may exist between devices. For example, a B2 and a B3 in the TSN belong to different TSN domains. After receiving a TLV 23 sent by the B2, a port P3 of the B3 finds that an identifier of a TSN domain to which a controller of the TLV 23 belongs is different from an identifier of a TSN domain to which the P3 belongs, and the P3 forwards, to the B2, a TLV 25 of a controller in the TSN domain to which the P3 belongs. The B2 then forwards the TLV 25 to an active controller in the TSN domain to which the B2 belongs.

Figure 11:
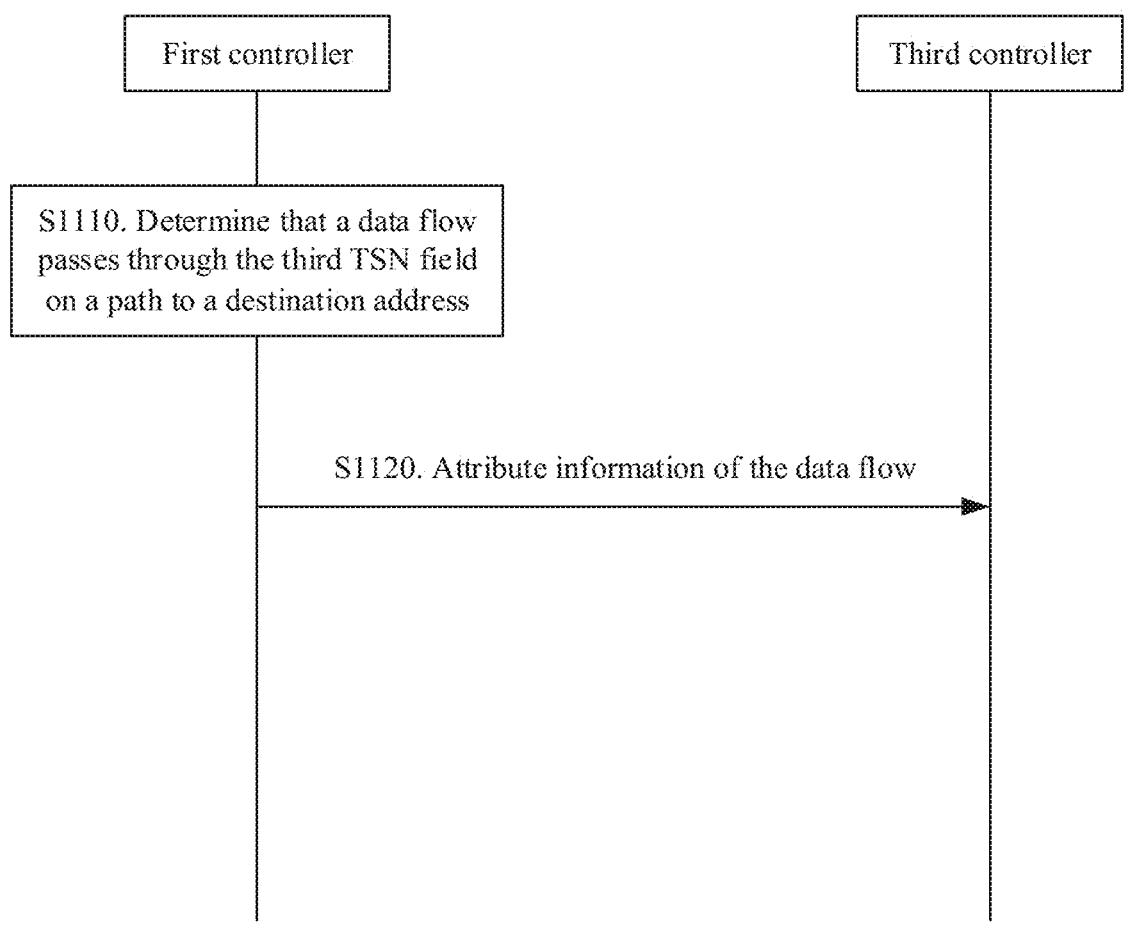
FIG. 11 is a flowchart of a method for communication between controllers in TSN according to an embodiment of the present disclosure.

Optionally, the communication method between controllers described in Embodiment 2 may further include the method steps shown in FIG. 11. As shown in FIG. 11, a flowchart of still another communication method between controllers is provided. According to the method shown in FIG. 11, communication between controllers can be implemented, and further configuration of a data flow across different TSN domains can be implemented by the controller. The method includes the following steps.

S1110. A first controller determines, based on a destination address of a data flow, a third TSN domain through which the data flow passes to the destination address.

In a possible implementation, the first controller determines, based on the destination address of the data flow, that a next TSN domain through which the data flow passes is a neighboring TSN domain.

In a possible implementation, the first controller determines, based on an IP address or a MAC address of the data flow, one or more TSN domains through which the data flow passes to the destination address.

In a possible implementation, the first controller stores a correspondence between a MAC address and a TSN domain identifier. The first controller determines a corresponding TSN domain based on the MAC address of the data flow. Optionally, the first controller stores TSN network topology information, and the first controller determines, based on the MAC address of the data flow, information about a path of the data flow to the destination address. The first controller further determines, based on a network device through which the data flow passes, the one or more TSN domains through which the data flow passes.

S1120. The first controller sends attribute information of the data flow to an active controller in the third TSN domain.

In a possible implementation, the attribute information of the data flow includes one or more of a talker, a stream identifier, a stream rank, an end station port, a port identifier, a data frame specification, a media access control MAC address, a virtual local area network VLAN tag, an IPv4-tuple, an IPv6-tuple, a traffic specification, traffic specification time aware, a user-to-network requirement, a port capability, a listener, a status, state information, an accumulated latency, a port configuration, a time aware offset, and a failed port.

According to the foregoing method, exchange between the controllers can be implemented, and further a data flow passing through a plurality of TSN domains can be configured, to support collaborative configuration between controllers in the plurality of TSN domains.

Figure 12:
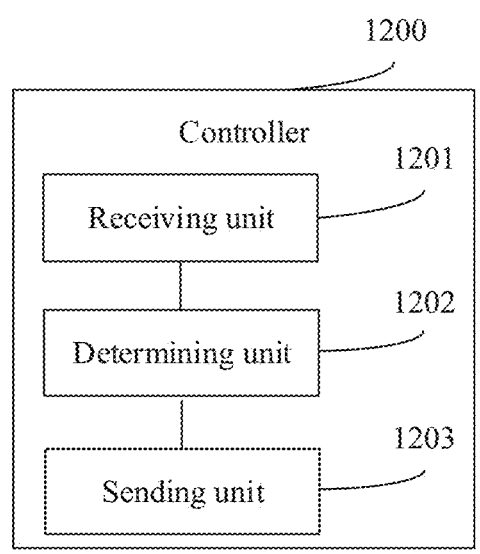
FIG. 12 is a diagram of a structure of a controller according to an embodiment of the present disclosure.

FIG. 12 is a possible diagram of a structure of the controller in the foregoing embodiments. The controller may implement a function of the first controller or the second controller in the embodiments shown in FIG. 5 and FIG. 8 to FIG. 11. Refer to FIG. 12. A controller 1200 includes a receiving unit 1201, a determining unit 1202, and a sending unit 1203. These units may perform corresponding functions of the controller in the foregoing method examples. The receiving unit 1201 is configured to support the controller 1200 to perform the processes S520 and S550 in FIG. 5, the process S920 in FIG. 9, and the processes S1020 and S1050 in FIG. 10. The determining unit 1202 is configured to support the controller 1200 to perform the process S530 in FIG. 5, the processes S930 and S940 in FIG. 9, the process S1030 in FIG. 10, and the process S1110 in FIG. 11. The sending unit 1203 is configured to support the controller 1200 to perform the processes S510 and S540 in FIG. 5, the processes S910 and S950 in FIG. 9, the processes S1010 and S1040 in FIG. 10, and the process S1120 in FIG. 11.

The receiving unit 1201 is configured to perform various information receiving performed by the controller in the foregoing method embodiments. The determining unit 1202 is configured to perform a determining action performed by the controller in the foregoing method embodiments. The sending unit 1203 is configured to perform various information sending performed by the controller in the foregoing method embodiments.

In a possible implementation, the receiving unit 1201 is configured to receive a first packet including an identifier of a TSN domain to which a second controller belongs. The determining unit 1202 is configured to determine, based on a TSN domain identifier of the second controller, that a first controller and the second controller belong to a same TSN domain. The sending unit 1203 is configured to send, to the second controller, a second packet including user information stored by the first controller. For a specific execution process, refer to detailed descriptions of corresponding steps in the embodiments shown in FIG. 5 and FIG. 8 to FIG. 11.

In a possible implementation, the receiving unit 1201 is configured to receive a first packet including an identifier of a TSN domain to which a second controller belongs. The determining unit 1202 is configured to determine, based on a TSN domain identifier of the second controller, that a first controller and the second controller do not belong to a same TSN domain. The sending unit 1203 is configured to send, to the second controller, a second packet that includes an identifier of a first TSN domain to which the controller belongs and an identifier of a second TSN domain adjacent to the first TSN domain. For a specific execution process, refer to detailed descriptions of corresponding steps in the embodiments shown in FIG. 5 and FIG. 8 to FIG. 11.

It should be noted that, in this embodiment of the present disclosure, division into units is an example, and is merely a logical function division. In actual implementation, another division manner may be used. Function units in the embodiments of the present disclosure may be integrated into one processing unit, or each of the units may exist alone physically, or two or more units are integrated into one unit. For example, in the foregoing embodiments, the receiving unit and the sending unit may be a same unit or different units. The integrated units may be implemented in a form of hardware, or may be implemented in a form of a software function unit.

Figure 13:
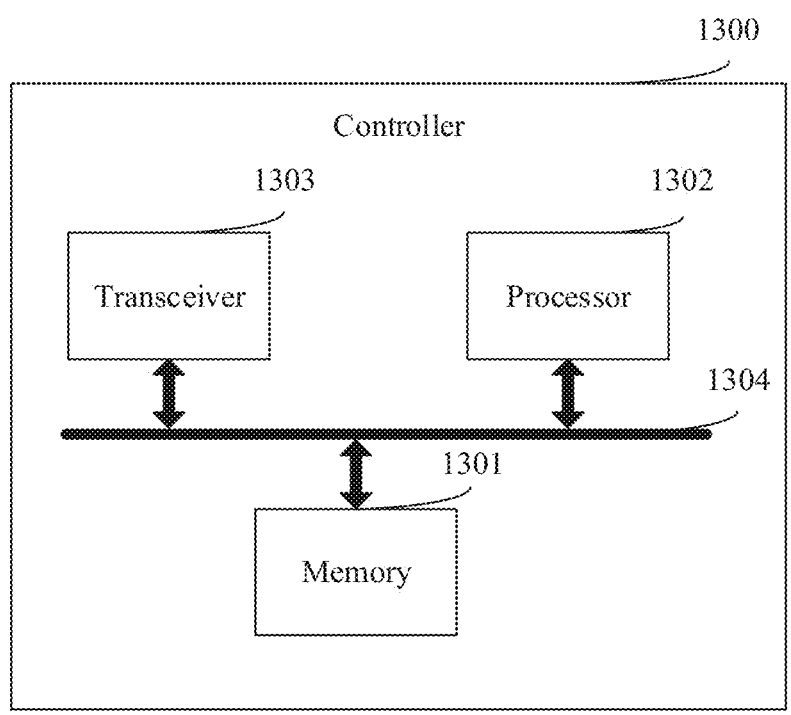
FIG. 13 is a diagram of a structure of a controller according to an embodiment of the present disclosure.

FIG. 13 is a diagram of a structure of a controller according to an embodiment of the present disclosure. The controller 1300 includes a processor 1302, a transceiver 1303, a memory 1301, and a bus 1304. The transceiver 1303, the processor 1302, and the memory 1301 are interconnected through the bus 1304. The bus 1304 may be a PCI bus, an EISA bus, or the like. The bus may be classified into an address bus, a data bus, a control bus, and the like. For ease of representation, only one thick line is used to represent the bus in FIG. 13, but this does not mean that there is only one bus or only one type of bus. The controller 1300 may implement a function of the controller in the embodiments shown in FIG. 5 and FIG. 8 to FIG. 11. The processor 1302 and the transceiver 1303 may perform a corresponding function of the controller in the foregoing method examples. The transceiver 1303 is configured to support the controller 1300 to perform the processes S510, S520, S540, and S550 in FIG. 5, the processes S910, S920, and S950 in FIG. 9, the processes S1010, S1020, S1040, and S1050 in FIG. 10, and the process S1120 in FIG. 11. The processor 1302 is configured to support the controller 1300 to perform the process S530 in FIG. 5, the processes S930 and S940 in FIG. 9, the process S1030 in FIG. 10, and the process S110 in FIG. 11. The memory 1301 is configured to store program code and data of the controller 1300.

The following describes each component of the controller with reference to FIG. 13.

The memory 1301 may be a volatile memory, for example, a random-access memory (RAM); or a non-volatile memory, for example, a read-only memory (ROM), a flash memory, a hard disk drive (HDD), or a solid-state drive (SSD); or a combination of the foregoing types of memories; and is configured to store program code that can implement the method in the present disclosure, a configuration file of a network device in a TSN domain, or other content.

The processor 1302 is a control center of the controller; and may be a central processing unit (CPU), or may be an application-specific integrated circuit (ASIC), or one or more integrated circuits configured to implement the embodiments of the present disclosure, for example, one or more digital signal processors (DSP), or one or more field programmable gate arrays (FPGA).

The transceiver 1303 is configured to communicate with another device.

In a possible implementation, the controller may be configured to be the controller 101 or the controller 108 in FIG. 2, the controller 101 may be referred to as the first controller, and the controller 108 may be referred to as the second controller. The processor 1302 runs or executes a software program and/or a module stored in the memory 1301, and invokes the data stored in the memory 1301, to perform the following functions: determining, based on a domain identifier of a second controller, that a first controller and the second controller belong to a same TSN domain; and receiving, by using the transceiver 1303, a first packet that is sent by the second controller and that carries an identifier of a TSN domain to which the second controller belongs, and sending, to the second controller, a second packet that carries user information.

In a possible implementation, the controller may be configured to be the controller 301 or the controller 308 in FIG. 3, the controller 301 may be referred to as the first controller, and the controller 308 may be referred to as the second controller. The processor 1302 runs or executes a software program and/or a module stored in the memory 1301, and invokes the data stored in the memory 1301, to perform the following functions: determining, based on a TSN domain identifier of a second controller, that a first controller and the second controller do not belong to a same TSN domain: and receiving, by using the transceiver 1303, a first packet that is sent by the second controller and that carries an identifier of a TSN domain to which the second controller belongs, and sending, to the second controller, a second packet that carries an identifier of a first TSN domain to which the first controller belongs and an identifier of a second TSN domain adjacent to the first TSN domain.

For a specific execution process, refer to detailed descriptions of corresponding steps in the embodiments shown in FIG. 5 and FIG. 8 to FIG. 11.

Figure 14:
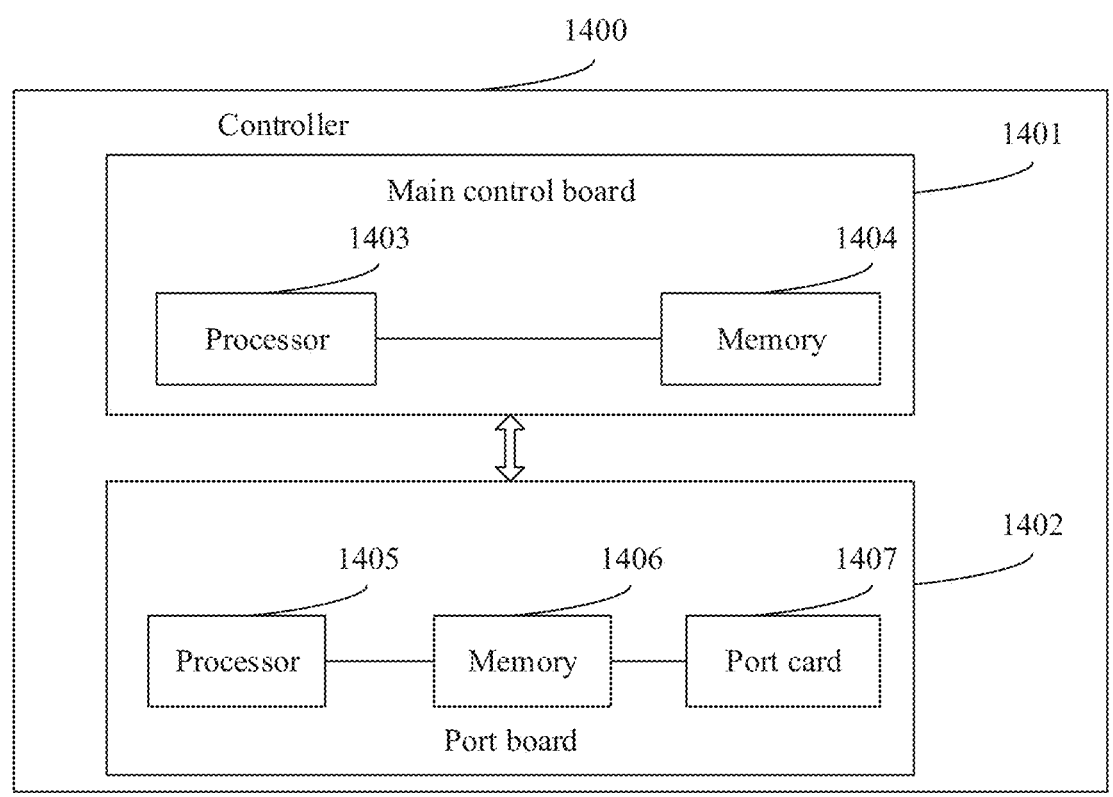
FIG. 14 is a diagram of a structure of a controller according to an embodiment of the present disclosure.

FIG. 14. is a diagram of a structure of an apparatus having a controller entity according to an embodiment of the present disclosure. The controller 1400 is a router, a switch, or a network device having a forwarding function, and the controller 1400 can implement a function of the first controller or the second controller in the foregoing method embodiments. The controller 1400 includes a main control board 1401 and a port board 1402. The main control board 1401 includes a processor 1403 and a memory 1404. The port board 1402 includes a processor 1405, a memory 1406, and a port card 1407. The main control board 1401 and the port board 1402 are coupled.

The hardware may perform the corresponding function in the foregoing method examples. For example, the memory 1406 may be configured to store program code of the port board 1402. The processor 1405 may be configured to invoke the program code in the memory 1406 to trigger the port card 1407 to perform the various information receiving and sending performed by the controller in the foregoing method embodiments. For example, the processor 1405 invokes the program code in the memory 1406 to trigger the port card 1407 to support the controller 1400 to perform the process S530 in FIG. 5 and the process S1030 in FIG. 10.

The processor 1405 is further configured to send a service identifier to the main control board 1401.

The memory 1404 may be configured to store program code of the main control board 1401, and the processor 1403 is configured to invoke the program code in the memory 1404 to perform processing other than information receiving and sending performed by the controller in the foregoing method embodiments. For example, the processor 1403 is configured to support the first controller 1400 to perform the processes S930 and S940 in FIG. 9 and the process SI 110 in FIG. 11. The storage unit 1404 is configured to store program code and data of the main control board 1401. For a specific execution process, refer to detailed descriptions of corresponding steps in the embodiments shown in FIG. 5 and FIG. 8 to FIG. 11.

In a possible implementation, an interprocess communication (IPC) control channel is established between the main control board 1401 and the interface board 1402, and communication is performed between the main control board 1401 and the interface board 1402 through the IPC control channel.

Figure 15:
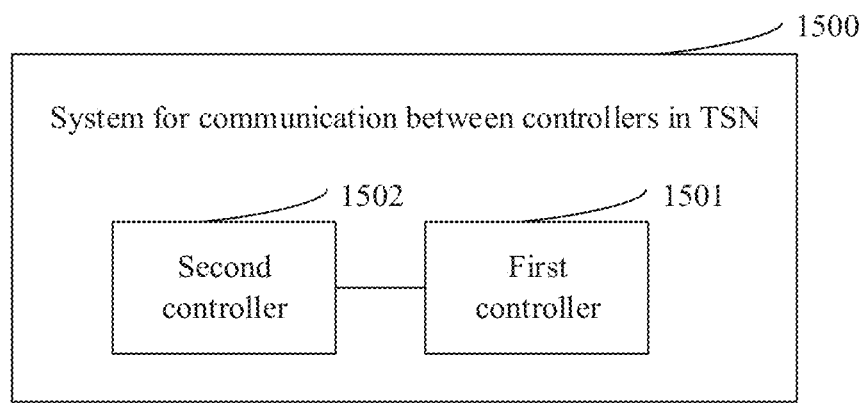
FIG. 15 is a diagram of a structure of a system for communication between controllers according to an embodiment of the present disclosure.

Refer to FIG. 15. An embodiment of the present disclosure provides a system 1500 for a communication service between controllers in TSN. The system 1500 is configured to implement the service packet sending method in the foregoing method embodiments. The system 1500 includes a first controller 1501 and a second controller 1502. The first controller 1501 and the second controller 1502 may separately implement a function of the first controller and a function the second controller in the embodiments shown in FIG. 5 and FIG. 8 to FIG. 11.

For example, the first controller 1501 performs the processes S510, S530, and S550 in FIG. 5, the process S910 in FIG. 9, the processes S1010, S1030, and S1040 in FIG. 10, the processes S1110 and S1120 in FIG. 11, and/or another process performed by the first controller in the technology described in this specification. The second controller 1502 performs the processes S520, S530, and S540 in FIG. 5, the processes S920 to S950 in FIG. 9, the processes S1020 and S1050 in FIG. 10, and/or another process performed by the second controller in the technology described in this specification.

In a possible implementation, the first controller is configured to receive a first packet sent by the second controller: determine, based on a TSN domain identifier of the second controller, that the first controller and the second controller belong to a same TSN domain, and send a second packet to the second controller. The first packet includes an identifier of a TSN domain to which the second controller belongs. The second packet includes user information stored by the first controller.

The second controller is configured to send the first packet and receive the second packet.

In a possible implementation, the first controller is configured to receive a first packet sent by the second controller; determine, based on a TSN domain identifier of the second controller, that the first controller and the second controller do not belong to a same TSN domain: and send a second packet to the second controller. The first packet includes an identifier of a TSN domain to which the second controller belongs. The second packet includes an identifier of a first TSN domain to which the first controller belongs and an identifier of a second TSN domain adjacent to the first TSN domain.

An embodiment of the present disclosure further provides a storage medium configured to store software instructions used in the foregoing embodiments. The software instructions include a program used to perform the method shown in the foregoing embodiments. When the software instructions are executed on a computer or a device, the computer or the device is enabled to perform the method in the foregoing method embodiments.

An embodiment of the present disclosure further provides a computer program product. The computer program product includes computer program code. When the computer program code is run on a computer, the computer is enabled to perform the method in the foregoing method embodiments.

It should be noted that, any apparatus embodiment described above is merely an example. The units described as separate parts may or may not be physically separate, and parts displayed as units may or may not be physical units, that is, may be located in one place, or may be distributed onto a plurality of network units. Some or all of the modules may be selected based on an actual requirement to achieve the objectives of the solutions of the embodiments. In addition, in the accompanying drawings of the embodiments of the first network device or the controller provided by the present disclosure, connection relationships between modules indicate that the modules have communication connections with each other, and the communication connection may be implemented as one or more communication buses or signal lines. A person of ordinary skill in the art may understand and implement the embodiments without creative efforts.

Methods or algorithm steps described in combination with the content disclosed in the embodiments of the present disclosure may be implemented by hardware, or may be implemented by a processor by executing a software instruction. The software instruction may include a corresponding software module. The software module may be stored in a random-access memory (RAM), a flash memory, a read-only memory (ROM), an erasable programmable read-only memory (EPROM), an electrically erasable programmable read-only memory (EEPROM), a hard disk, a removable hard disk, a compact disc, or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in a core network interface device. Certainly, the processor and the storage medium may alternatively exist as discrete components in a core network interface device.

A person skilled in the art should be aware that in the foregoing one or more examples, functions described in the present disclosure may be implemented by hardware, software, firmware, or any combination thereof. When the present disclosure is implemented by software, the foregoing functions may be stored in a computer-readable medium or transmitted as one or more instructions or code in the computer-readable medium. The computer-readable medium includes a computer storage medium and a communication medium, where the communication medium includes any medium that enables a computer program to be transmitted from one place to another. The storage medium may be any available medium accessible to a general-purpose or dedicated computer.

The objectives, technical solutions, and benefits of the present disclosure are further described in detail in the foregoing specific implementations. It should be understood that the foregoing descriptions are merely specific implementations of the present disclosure, but are not intended to limit the protection scope of the present disclosure. Any modification, equivalent replacement, or improvement made based on the technical solution of the present disclosure shall fall within the protection scope of the present disclosure.

What is claimed is:

1. A method implemented by a first controller, the method comprising:
receiving a first packet from a second controller, wherein the first packet comprises an identifier of a time sensitive networking (TSN) domain to which the second controller belongs;
determining, based on the identifier, that the first controller and the second controller belong to the TSN domain;
sending a second packet to the second controller, wherein the second packet comprises user information stored by the first controller;
receiving, when an active controller fails, a valid value of a third controller from the third controller, wherein the third controller and the first controller belong to the TSN domain;
determining, based on the valid value, that the third controller is in an election state; and
determining, according to a first preset rule, that one controller in a plurality of controllers in the election state in the TSN domain to which the first controller belongs is the active controller.

2. The method of claim 1, wherein the user information comprises a talker, a stream identifier, a stream rank, an end station port, a port identifier, a data frame specification, a media access control (MAC) address, a virtual local area network (VLAN) tag, an Internet Protocol version 4 tuple (IPv4-tuple), an Internet Protocol version 6 tuple (IPv6-tuple), a traffic specification, traffic specification time aware, a user-to-network requirement, a port capability, a listener, a status, status information, an accumulated latency, a port configuration, a time aware offset, or a failed port.

3. The method of claim 1, further comprising:
obtaining a valid value of the second controller;
determining, based on the valid value of the second controller, that the second controller is in an election state; and
determining, according to a second preset rule, that one controller in a plurality of controllers in the election state in the TSN domain is an active controller.

4. The method of claim 1, wherein the valid value is included in the first packet from the second controller.

5. The method of claim 2, wherein the first packet further comprises the MAC address of the second controller.

6. The method of claim 4, wherein the first packet is an Edge Control Protocol (ECP) packet.

7. The method of claim 1, wherein the first controller communicates with the second controller using a controller-controller protocol (CCP).

8. The method of claim 1, further comprising:
receiving the first packet through a first port;
determining whether the first port and a second port of the first controller belong to a same TSN domain; and
forwarding the first packet to a first network device through the second port when the first controller determines that the first port and the second port belong to the same TSN domain.

9. The method of claim 1, wherein the first packet further comprises an identifier or a destination address of the second controller, and wherein sending the second packet to the second controller comprises sending the second packet to the second controller based on the identifier or the destination address of the second controller.

10. A first controller comprising a memory configured to store instructions; and one or more processors coupled to the memory and configured to execute the instructions to cause the first controller to:
receive a first packet from a second controller, wherein the first packet comprises an identifier of a time sensitive networking (TSN) domain to which the second controller belongs;
determine, based on the identifier, that the first controller and the second controller belong to the TSN domain;
send a second packet to the second controller, wherein the second packet comprises one or more user information stored by the first controller;
receive, when an active controller fails, a valid value of a third controller from the third controller, wherein the third controller and the first controller belong to the TSN domain;
determine, based on the valid value, that the third controller is in an election state; and
determine, according to a first preset rule, that one controller in a plurality of controller in the election stat is the TSN domain to which the first controller belongs is the active controller.

11. The first controller of claim 10, wherein the user information comprises a talker, a stream identifier, a stream rank, an end station port, a port identifier, a data frame specification, a media access control (MAC) address, a virtual local area network (VLAN) tag, an Internet Protocol version 4 tuple (IPv4-tuple), an Internet Protocol version 6 tuple (IPv6-tuple), a traffic specification, traffic specification time aware, a user-to-network requirement, a port capability, a listener, a status, status information, an accumulated latency, a port configuration, a time aware offset, or a failed port.

12. The first controller of claim 10, wherein the one or more processors execute the instructions to further cause the first controller to:
obtain a valid value of the second controller from the first packet;
determine, based on the valid value, that the second controller is in an election state; and
determine, according to a second preset rule, that one controller in a plurality of controllers in the election state in the TSN domain is an active controller.

13. The first controller of claim 12, wherein the valid value is included in the first packet from the second controller.

14. The first controller of claim 10, wherein the first packet is an edge control protocol (ECP) packet.

15. The first controller of claim 10, wherein the first controller communicates with the second controller using a controller-controller protocol (CCP).

16. The first controller of claim 10, wherein the one or more processors execute the instructions to further cause the first controller to:
receive the first packet at a first port of the first controller;
determine whether the first port and a second port of the first controller belong to the TSN domain; and
forward the first packet to a first network device when the first port and the second port belong to the TSN domain.

17. The first controller of claim 10, wherein the first packet further comprises an identifier or a destination address of the second controller; and the one or more processors execute the instructions to is further cause the first controller to send the second packet to the second controller based on the identifier or the destination address of the second controller.

18. A system for communication between controllers in time sensitive networking (TSN), wherein the system comprises:
a first controller configured to:
receive a first packet from a second controller, wherein the first packet comprises a TSN domain identifier of the second controller;
determine, based on the TSN domain identifier, that the first controller and the second controller belong to a TSN domain;
send a second packet to the second controller, the second packet comprises user information stored by the first controller;
receive, when an active controller fails, a valid value of a third controller from the third controller, wherein the third controller and the third controller belong to the TSN domain:
determine, based on the valid value, that the third controller is in an election state; and
determine, according to a first preset rule, that one controller in a plurality of controllers in the election state in the TSN domain to which the first controller belongs is the active controller; and
the second controller configured to:
send the first packet; and
receive the second packet.

* * * * *

UNITED STATES PATENT AND TRADEMARK OFFICE
CERTIFICATE OF CORRECTION

PATENT NO. : 11,811,511 B2
APPLICATION NO. : 17/531122
DATED : November 7, 2023
INVENTOR(S) : Lihao Chen It is certified that error appears in the above-identified patent and that said Letters Patent is hereby corrected as shown below:

In the Claims

Claim 4, Column 25, Line 48: "claim 1, wherein" should read "claim 3, wherein"

Signed and Sealed this
Second Day of January, 2024

Katherine Kelly Vidal
*Director of the United States Patent and Trademark Office*